(12) United States Patent  (10) Patent No.: US 7,536,292 B2
Monin et al.  (45) Date of Patent: May 19, 2009

(54) METHOD OF GENERATING A PERFORMANCE MODEL FROM A FUNCTIONAL MODEL

(75) Inventors: Wei Monin, Grenoble (FR); Fabrice Dubois, Lannion (FR); Daniel Vincent, Pleumeur Bodou (FR); Pierre Combes, Palaiseau (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/511,033

(22) PCT Filed: Apr. 18, 2003

(86) PCT No.: PCT/FR03/01251

§ 371 (c)(1),
(2), (4) Date: Jun. 6, 2005

(87) PCT Pub. No.: WO03/092245

PCT Pub. Date: Nov. 6, 2003

(65) Prior Publication Data

US 2005/0256692 A1    Nov. 17, 2005

(30) Foreign Application Priority Data

Apr. 23, 2002    (FR) .................................. 02 05063

(51) Int. Cl.
*G06F 9/45* (2006.01)
(52) U.S. Cl. ....................................................... 703/22
(58) Field of Classification Search ..................... 703/6, 703/22; 709/223, 224
See application file for complete search history.

(56) References Cited

U.S. PATENT DOCUMENTS

| 6,061,724 | A | 5/2000 | Ries et al. |
| 6,324,496 | B1 * | 11/2001 | Alur et al. .................... 703/17 |
| 2002/0022952 | A1 | 2/2002 | Zager et al. |

OTHER PUBLICATIONS

Canevet et al., Mar. 2003, IEEE, Performance modeling with the unified modeling language and stochastic process algebras, pp. 107-120.*
Wu, 2004, ACM Press, Performance Modeling from Software Components, pp. 290-301.*
Nachef, Armand. "Modelisation des systemes distribues", Technique et Science Informatiques, vol. 12, No. 2, pp. 163-192, with English abstract 1993.

(Continued)

*Primary Examiner*—Paul L Rodriguez
*Assistant Examiner*—Eunhee Kim
(74) *Attorney, Agent, or Firm*—Oblon, Spivak, McClelland, Maier & Neustadt, P.C.

(57) ABSTRACT

A process for generating a performance model from a functional model for a system including a plurality of distributed hardware and software entities that engage to provide a service to at least one user. The process distributes the representative system requests in a finite number of groups and identifies, for each request group, the corresponding execution flow, formalizes the execution flows by a notation that makes it possible to highlight the causal relationships between the different software entities of the system that are involved in the execution flows and the data characterizing the system's resource consumption, develops an intermediate model, and automates the conversion of the developed intermediate model into a performance model.

10 Claims, 17 Drawing Sheets

OTHER PUBLICATIONS

Diefenbruch, Marc et al. "The QUEST-approach for the Performance Evaluation of SDL-Systems", Proceedings of IFIP Joint Int. Conf. on Formal Description Techniques for Distributed Systems and Communication Protocols, and Protocol Specification, Testing and Verification, pp. 229-244, XP008012431 1996.

Shousha, Christiane et al. "Applying Performance Modelling to a Telecommunication System", Proceedings of the 1st International Workshop on Software and Performance, pp. 1-6, XP000846861 1998.

Bause, Falko et al. "Qualitative and Quantitative Analysis of Timed SDL Specifications", Springer-Verlag, pp. 486-500 1993.

Smith, Connie et al. "Performance Engineering Evaluation of Object-Oriented Systems with SPE-ED", Computer Performance Evaluation Modelling Techniques and Tools, No. 1245, pp. 135-154 1997.

Buetow, M. et al. "Performance Modelling with the Formal Specification Language SDL", FORTE-PST, pp. 213-227 1996.

Steppler, Martin et al. "SPEET—SDL Performance Evaluation Tool", SDL '97: Time for Testing, Proceeding of the 8th SDL Forum, pp. 53-67 1997.

Diefenbruch, Marc. "Funktionale und quantitative Verifikation von zeit-und ressourcenerweiterten SDL-Systemen mittels Model-Checking", Proceeding of Messung, Modellierung und Bewertung van Rechen-und Kommunikationssystemen, pp. 231-248 1997.

Mitschele-Thiel, Andreas et al. "Performance engineering of SDL/MSC systems", Computer Networks, vol. 31, pp. 1801-1815 1999.

Schaffer, Chr. et al. "EaSy-Sim: A Tool Environment for the Design of Complex, Real-Time Systems", Proceeding International Conference on Computer Aided Systems Technologies, pp. 358-374 1995.

El-Sayed, Hesham et al. "Automated Performance Modeling from Scenarios and SDL Designs of Distributed Systems", Proceeding of International Symposium on Software Engineering for Parallel and Distributed Systems, pp. 127-135 1998.

Bause, Falko et al. "SDL and Petri Net Performance Analysis of Communicating Systems", Doctoral Thesis, Dept. of Computer Science, University of Cape Town, pp. 1-15 1997.

Hendaz, M. "A Dynamic Annotation for Performance Evaluation of Systems Specified in Estelle", Doctoral Thesis from the University of Paris, pp. 1-148, with English translation of Annexes 1 and 2 1996.

Martins, Juan-Jose. "A System Engineering Methodology Integrating Performance Evaluation and Formal Specification", PhD thesis, l'Ecole Polytechnique de Lausanne, pp. i-vi, 1-168 1996.

Heck, E. "Performance Evaluation of Formally Specified Systems: The Integration of SDL with HIT", Doctoral Thesis, University of Dortmund, pp. 1-234, A1-C25 1996.

\* cited by examiner end delav(t)

expect(c)

oriented arc

N oriented arcs

Emissions

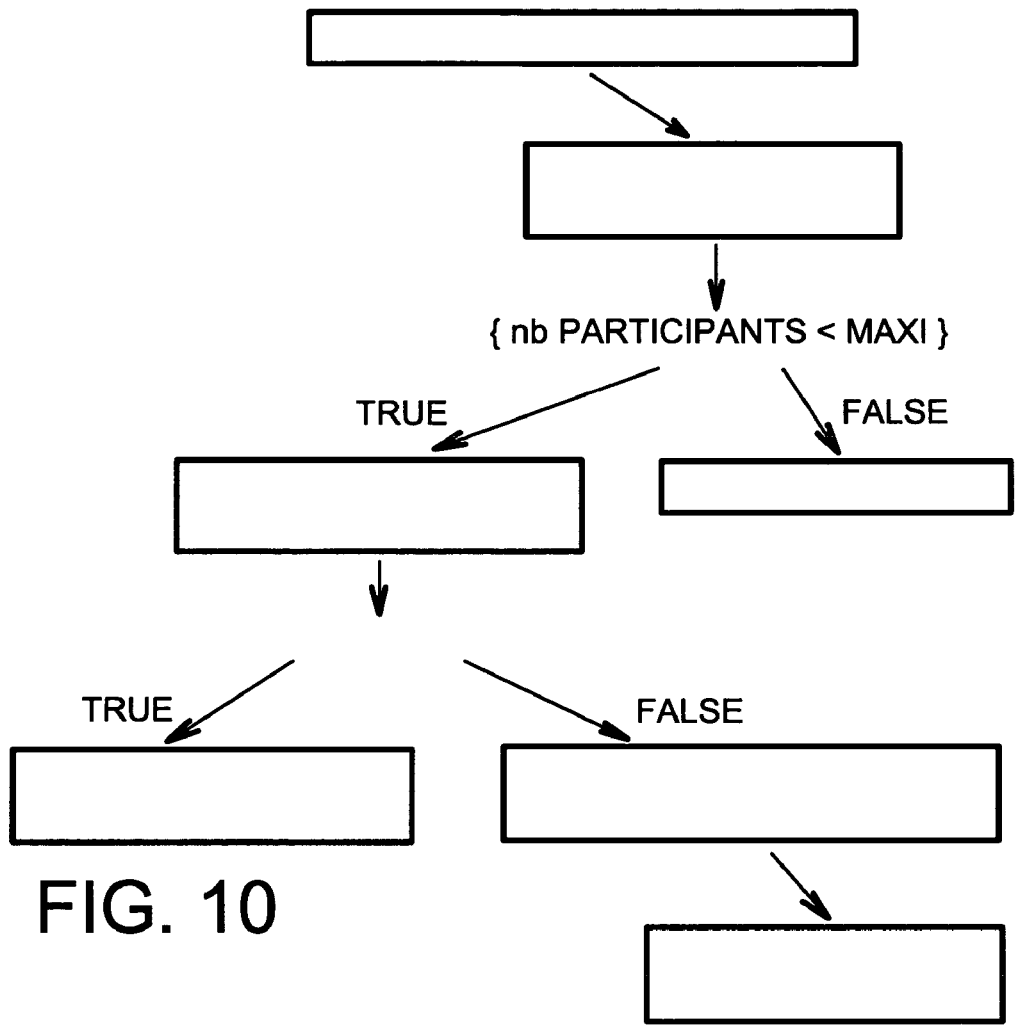
FIG. 10
FIG. 11
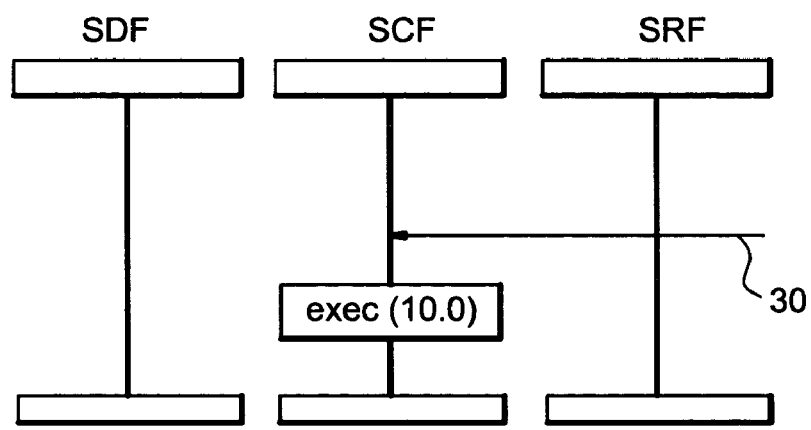

METHOD OF GENERATING A PERFORMANCE MODEL FROM A FUNCTIONAL MODEL

TECHNICAL FIELD

The invention falls within the field of the performance analysis by simulation of a system, such as for example a telecommunications system, that comprises a plurality of distributed hardware and software components which engage to provide a service to one or more users.

The invention relates more specifically to a process for generating a performance model from a functional model of such a system.

THE PRIOR ART

When creating then deploying a system, it is necessary to ensure that it has the expected functional capacities, but also that it will hold the load in operating conditions. If there are failures in performance, it may even happen that the system no longer performs the expected services. The first objective of a performance analysis is to anticipate system collapse phenomena so as to avert any malfunction.

Performance analysis makes it possible to obtain accurate knowledge of system resource distribution and therefore to identify any bottlenecks. A second objective is economic in nature. It is to determine the optimum resource configurations, so as to maximize their efficiency and thereby obviate the purchase of additional equipment. The resources are dimensioned by determining the quantitative parameters necessary for the desired quality of service such as for example the size of the buffers, the number of servers, the distribution of the processing entities over the different machines, etc.

Performance is analysed either on a model, or on the actual system via measurements. When it is on a model, two types of behaviour of the system being analysed may generally be observed, transitory behaviour and stationary behaviour. The first relates to short periods and the second to long periods. The most requested approaches are particularly mathematical techniques, discrete simulation, and graph-based analysis.

The notations for expressing the models are often of the following types:
  queuing systems,
  timed Petri nets,
  timed automata,
  hierarchical models or text descriptions in specialised languages.

Performance evaluation depends on the technique used which must be selected by taking account of the characteristics of the application under consideration. Resolution techniques are classified in three main categories:
  analytical method,
  actual tests, and
  simulation.

The analytical method more often than not uses queuing system theory, or stochastic Petri nets.

Queuing systems remain one of the most powerful mathematical formalisms allowing a very wide variety of systems to be analysed quantitatively. For example, a computer system may be considered, in a very abstract way, as a set of hardware and software resources (servers) used by tasks or programs (customers). Since the resources are limited in number, the programs will compete in order to access these resources, and this competition is resolved by queues.

The formalism of the Petri nets is based on a graphic representation that allows the system's behaviour to be fully understood. This formalism is particularly appropriate for systems whose behaviour is strongly characterised by aspects of competition, synchronisation, communication and engagement. The system may be analysed qualitatively (absence of deadlock, reliability, etc.).

One major handicap of the Petri net lies in the explosion of the number of statuses to be examined when the complexity of the system increases.

Finally, the analytical approach generally consists in expressing the system's behaviour in the form of an exact mathematical model leading to closed formulae. The behaviour of the system is then reduced to a set of variables related to each other by equations. The main benefit of this analytical approach lies in the fact that it does not require a sophisticated support tool during the problem modelling and resolution phases, which is particularly appropriate for the upstream phases of an application design. With this approach, the formula only has to be applied to determine the quantities sought and above all to find out the relative influence of the different parameters. This approach, for which some major assumptions commonly need to be made (independence of events, conservativity of the servers, etc.), proves feasible for systems with relatively simple functional architecture such as for example the analysis of transport network switching systems. In addition, the analytical method proves well adapted to the analysis of system behaviour "worst-case scenarios", by making simplifying and pessimistic approximations.

However, software systems lend themselves much less readily to analytical methods, since they vary considerably in behaviour. Indeed, operating system behaviour depends heavily on the architecture of the machine, about which only very little information is often available. Also, the interactions between the different processes may be very complex and difficult to characterise by probability laws.

In distributed systems, additional complications arise out of the engagement between heterogeneous systems where only a partial view of the system status is available at the level of each component. In the case of telecommunications services, it is also difficult to characterise the behaviour of the customers generating the request traffic.

Unlike the analytical method, the actual test approach consists, through an observation infrastructure (probes), in taking measurements directly on the actual system. Observation generally occurs either at software level, or at operating system level, or at both levels simultaneously. The advantage of this approach is that actual results are obtained, particularly in respect of the processing load capacity of the system (load increase).

Measuring performance on an actual system requires a comprehensive layout of the system for testing (hardware and software) to be available, with the result that analysis can only be carried out after the event, and may involve the purchase of expensive materials. Making a probe to inspect the system is a difficult task since the instrumentation must not in any significant way disrupt what is being measured. In particular the distribution of the machines requires satisfactory clock synchronisation. Moreover, any modification to the software or hardware involves additional implementation costs in terms of interoperability and portability, reconfiguration, and adjustments. Additionally, the testing programs must be developed and themselves tested and are closely related to the actual application code, which is all the more constricting in that the processes for developing and implementing an application are short. It is therefore often necessary to develop the application and the test programs in parallel, which leads to major synchronisation constraints at development organisation level. Finally, the actual tests suffer from a limitation arising out of the fact that only straightforward configurations can be considered. For example, the processing capacity is evaluated by testing the system behaviour when service requests arrive simultaneously. Conversely, to find out the change in response time (maximum time, average time, distribution etc.), in buffer occupation and in loss rates, it is necessary to generate a very high number of requests so that the statistical results of the tests are representative. On the other hand, it is also necessary to generate influxes of these requests in accordance with representative user behaviour scenarios. These influxes are characterised particularly by the average arrival rate and the pace (deterministic, in bursts, random over a period of time, exponential etc.). These constraints make it essential to have a number of customer machines available, since the number of active CPU processes is often limited to a few hundred. It is also necessary to be able to synchronise them in such a way that the generated user behaviour is close to reality, something which is very difficult to implement.

The simulation approach appears to be by far the most commonly used for evaluating the performance of all kinds of systems and consists in modelling the behaviour of the system, more often than not using a queuing or Petri net system, then in testing the model by varying a set of parameters corresponding to the different system configurations. For example, for software systems, the parameters may be the processor computation speed, the network transmission rate, the process sequencing policy, the number and topology of the machines, the rate and pace of arrival of the requests, etc. Simulation is easier to apprehend, and more powerful than the analytical method. Indeed, formulating the model for simulation is not expressed in the form of equations but of programs, which allows a model to be constructed that is as close as possible to the actual system being analysed. It is much less expensive in hardware and software than the testing approach since it uses a model (an abstraction, a virtual representation) instead of an actual system. This approach provides a powerful tool for predicting performance from the design of the system for analysis until its implementation.

Non-specialised software simulators have appeared since 1980 and we may cite by way of example QNAP [http://www.hyperformix.com], SIMSCRIPT [http://www.caci.com/index_main.shtml], OPNET [http://www.opnet.com], and SES/Workbench [http://www.hyperformix.com].

Unlike the test cycles, the time taken to run a simulation is not related to the actual application processing times. The simulation approach thus allows a larger number of scenarios to be implemented simply by varying the model parameters. Setting up a model often allows conjectures about the system under consideration to be expressed and certain elements of responses to the problems of performance to suggest themselves more easily. Simulations will allow these conjectures to be confirmed or invalidated. Other elements, such as end-to-end response time or loss rate distribution, are more often than not very difficult to quantify and only simulation allows them to be brought to the fore.

The simulation approach operates in four phases:

the development of the system behaviour model: this begins by selecting the system entities (a software component, a process, etc.) which it is sensible to model, relative to the exact objectives of the performance analysis. Development continues by specifying the operation of these entities, as well as their interactions. The entities are selected as a function of the desired degree of refinement of the results of the simulation, but also as a function of the initial data which can be procured. The parameters are significant characteristics of the system elements (for example, processing time per unit of an entity on a processor, number of servers, etc.), which are likely to affect the simulation results. The models are generally represented either by queuing systems (QNAP, SIMSCRIPT, SES/Workbench), or by automata (OPNET), or by Petri nets.

the acquisition of the quantitative data to sustain the simulations: for software systems, this data corresponds particularly to the times for processing the programs on the processors and to the transmission delays if routing operations through networks occur. They are measured by unit tests. A processing, or transmission delay, unit test corresponds to the processor (central processing unit) or network use time respectively when the resource is entirely dedicated to the processor.

the simulations and the collection of statistical results: system behaviour is observed by running the model using a simulator and by varying the parameters thereof; the results of each simulation are analysed and performance results deduced there from for the configurations selected.

validation of the simulation model: the confidence that may be invested in the simulation results requires the model to be validated. This consists in conducting a few carefully chosen representative actual tests and in comparing these actual results with those obtained by simulation.

In a general way, the simulation approach constitutes a good compromise between implementation costs and result value. By varying different parameters, it allows the behaviour of a system or application to be analysed under a great variety of configurations. This occurs without having all the target infrastructure of the system (hardware and software) and, for the applications, without their having to be fully developed. Furthermore, it is entirely suitable when it is wished to compare different technologies or products, as well as for dimensioning and optimising the system while it is being developed.

The main difficulties of the simulation approach lie in capturing the behaviour of the system for analysis, obtaining the quantitative unit measurements and finding out statistically the behaviour of the system's customers. Indeed, any simulation model is an approximation of the actual system, and the faithfulness of the model to reality depends heavily on the degree of refinement of the available knowledge about the system's operation. In fact software systems are often products presenting in the form of "black boxes", in other words executable programs for which the specifications are not available. Bringing in trace tools to understand the mechanisms and internal behaviour patterns and to have unit measurements in respect of all the elements composing the system for the modelling is a vital and delicate operation. Additionally, knowledge of user behaviour is also of paramount importance in sustaining the simulations, for example request arrival distribution, user scenario distribution, etc. Indeed, these elements have a not inconsiderable impact on system performance, particularly as regards response times. This knowledge can only be provided by measurements on an actual system. But, in general, very few statistics are available on this subject. Moreover for new applications, advance modelling of user profiles is required.

The move from a model based on a system's functional aspects to a performance model has been the subject of several works cited below by way of example.

Timed SDL (TSDL) [F. Bause and P. Buchholz, "Qualitative and Quantitative Analysis of Timed SDL Specifications", in N. Gerner, H. G. Hegering, J. Savolvod, (Eds.) Springer- Verlag, 1993] implements a form of timed transition system, constructed from an SDL specification in which to each transition is attached an exponential time. It does not include any concept of resource or load. From an intermediate representation in automaton form, the tool carries out qualitative and quantitative analysis using Markovian algorithms.

DL-net [H. M. Kabutz "Analytical performance evaluation of concurrent communicating systems using, SDL and stochastic Petri nets", Doctoral Thesis, department of Computer science, University of Cape Town, Republic of South Africa, 1997] converts a depleted SDL model (subject to heavy restrictions on the data type) into a QPN (Queuing Petri Nets) model, in other words a Petri net equipped with queues. It is only at this second level that the stochastic time information is introduced. A tool converts this model into a Markov chain which is then resolved. The semantics of the original SDL description may be different from that of SDLnet, but acceptable pragmatic solutions have been proposed, from the point of view of the authors of this approach.

SPECS (SDL Performance Evaluation of Concurrent Systems) [Butow M., Mestern M., Schapiro C., Kritzinger P. S., "Performance Modeling from Formal Specifications", FORTE-PST y' 96, Kaiserslautern, Germany, October 1996] makes it possible to model the resources (machines) by SDL blocks and the tasks running on a machine by processes within one and the same block. The processes in different blocks run concurrently, while the processes of the same block run in multi-task mode. Channel delays and reliability characteristics may be added. The model runs on a virtual machine which is derived from the SDL model.

The main objective of SPEET [SDL Performance Evaluation Tool) [M. Steppler, M. Lott, "SPEET—SDL Performance Evaluation Tool", in A. Cavalli, A. Sarma (Ed.), SDL'97—Time for Testing, Proceeding of the $8^{th}$ SDL Forum, Elsevier, 1997] is to analyse the performance of SDL specified systems running in a real-time environment. The systems may be a simulated or run on existing hardware emulators (Intel®, Motorola® and Siemens®). They are stimulated by traffic generators and interconnected via transmission links corresponding to physical channels. Users can easily define probes within the formal description and introduce load indications.

The approaches of [E. Heck, "Performance Evaluation of Formally Specified Systems—the integration of SDL with HIT", doctoral Thesis, University of Dortmund, Krehl Verlag, 1996.] and of [Martins J., "A system Engineering Methodology Integrating performance evaluation and Formal Specification", PhD thesis, l'Ecole Polytechnique de Lausanne, April 1996] introduce a conceptual framework (HIT) aiming at a synthesis of the formal description and performance evaluation techniques wherein the properties of these two worlds would be preserved. A tool converts an SDL model into a HIT model having a hierarchical structure that is pertinent to performance analysis. A translation (manual for the moment) has also been proposed towards an OPNET model, something which makes it possible to benefit from high performance simulators.

QUEST [M. Diefenbruch, "Functional and Quantitative Verification of Time-and resource Extended SDL Systems with Model-checking", in: K. Irmscher, (Ed.), Proceeding of Messung, Modellierung und Bewertung van Rechen-und Kommunikationssystemen, Freiberg, Germany, VDE-Verlag, 1997] is based on a QSDL (Queuing SDL) language which is an extension of the SDL language. By adding annotations indicating the machines providing services, service disciplines, the management of queues in the SDL model, the QSDL model makes it possible to evaluate by simulation the performance of the corresponding SDL specified system. It also makes it possible to validate and check a timed SDL system by model checking.

DO-IT Toolbox [A. Mitschele-Thiel and B. Mulier-Clostermann, "Performance Engineering of SDIJMSC systems", Journal on Computer Networks and ISDN Systems, Elsevier, 1998] evaluates the performance of MSC and SDL specified systems. Its originality is that it starts with the MSC that are available very early in the life cycle, adding load annotations to them and specifying the available resources for specific system runs. It provides a simple performance evaluation technique for analysing bottlenecks and optimising implementations, from deterministic service time assumptions.

EaSy-Sim [C. Schaffer and R. Raschhofer, A. Simma, "EaSy-Sim A Tool Environment for the design of Complex, Real-time systems", Proceeding International Conference on computer Aided Systems technologies, Innsbruck, Springer-Verlag, 1995] is a coupling between the GEODE environment for SDL and the SES/Workbench simulator. The SDL environment is used for verification and functional validation, whereas SES/Workbench models the non-functional part in order to evaluate performance. The coupling is implemented by exchanges of messages between the application's executable code obtained by GEODE and the SES/Workbench simulator. This tool may apply to an MSC specification in which response time requirements are added for real-time systems [C. Schaffer "MSC/RT: A Real-time extension to Message Sequence Charts (MSC), Internal Report TR 140-96, Institut für Systemwissenschaften, Johannes Kepler universität Linz, 1996].

EDT (Estelle Development Tool) [M. Hendaz, "Annotation Dynamique pour Evaluation de Performance des systèmes spécifiés en Estelle", Doctoral Thesis from the University of Paris 6, 1996.] is a set of tools based on the Estelle language. The translator converts an Estelle model into an intermediate model, annotated in such a way as to assign non nil execution times to the transitions. The times may have different distributions. The simulator/debugger (Edb), based on the semantic model defined in the Estelle standard, comprises a set of special functions allowing interactive and random simulations in the context of evaluating performance.

Configuration Planner [H. M. El-Sayed, D. Cameron and C. M. Woodside, "Automated performance modeling from scenarios and SDL design of distributed systems", Proceeding of International Symposium on Software Engineering for Parallel and Distributed Systems (PDSE'98), Kyoto, April 1998] is an approach that aims, for "soft time" and "hard time" real-time systems, to convert an MSC specified functional model automatically into an LQN (Layered Queuing Network) performance model. Simulating LQN models makes it possible to optimise, depending on the response time criterion, the distribution and sequencing of tasks over all the resources (the machines) in the system. In this model the memory constraint is unknown.

SPEED (Software Performance Engineering Early Design) [C. U. Smith and L. G. Williams, "Performance Engineering Evaluation of Object Oriented Systems with SPE-ED", Computer Performance Evaluation Modelling Techniques and Tools, No 1245, Springer-Verlag, Berlin, 1997] is a tool that allows the architecture and alternative solutions in object system design to be evaluated. The functional specification of the system is in the form of sequence diagrams representing execution traces (scenarios). The tool converts the specification model into a performance model represented by a queuing system. A combination of analysis and simulation allows potential performance problems, such as bottleneck phenomena, to be identified.

TLC (Trace-Based Load Characterisation) is an approach that works on the system's execution traces, which act as a basis for the construction of a layered performance model (LQN, or Layered Queuing Network). The traces—Message Sequence Charts—are obtained by simulating an SDL model, but must be annotated in order to clarify the causal dependencies that exist between the different actions performed. By analysing the detailed events in the simulation, the trace annotations are produced in accordance with an incremental marking principle, which has certain similarities to the blood colouring technique used in radiography, the angiogram. Once these causal chains are set up, communication diagrams, conventional in software systems, are identified, in practice, each message finds itself allocated a type, which may be "RPC" (remote procedure call), "Forward" (RPC propagated to a third party), "Reply" (reply to an RPC), or "Async" (asynchronous sending of a message). On the basis of this classification, an LQN model is produced automatically, parameterised then analysed with regard to performance. The LQN model is a specialisation of the conventional queuing model, adapted to the description of traditional software architectures, such as customer-server systems.

DRAWBACK OF THE PRIOR ART

The prior art approaches cited above consist either in carrying out analyses directly on a model, or in simulating a model with a specific simulator.

In the first case, the Markov assumptions are omnipresent. They may possibly be verified on simple systems. However, generally speaking they no longer apply in the case of complex systems within which numerous interactions take place. To make the Markov assumption is then to consider a fairly coarse approximation of the actual system, in the absence of anything better. As for the second case, most approaches introduce time annotations within the functional model. The resulting performance model generally comprises far too many details of a functional type, irrelevant in terms of performance, which compromise the efficiency of the simulation programs. It is important to keep in mind that a functional model and a performance model have fundamentally different objectives: as far as performance is concerned, it is assumed that the system is operating correctly and consequently, the functional details (all the logic properties) are of no importance, the only things that matter being the length of time a task occupies the CPU and the sequencing policy managing the simultaneous tasks. Likewise, marginal cases, which seldom arise and the effect of which will be statistically insignificant, are not taken into consideration. In fact, such cases can be numerous and their functional model can be very complex.

The last TLC approach is attractive by the fact that it takes into consideration a finite set of scenarios, rather than a comprehensive description of the system. However, the layered queuing model targeted (LQN) introduces high-level concepts which, for the purpose of promoting understanding of the system by the human being, prove both rigid and artificial in respect of performance analysis, and restrictive in terms of expressivity.

Finally, the TLC approach seeks to automate the identification of the causality links between the different events in a scenario, which seems to us very tricky in general terms. Indeed, the reaction of a system to a stimulus, quite often, is not conditioned only by this stimulus, but also by the internal status of the process; it should be said that the TLC approach attempts basically to define the external stimulus trigger factors (messages). In fact, the difficulty consists in expressing in the scenarios all the causality information required for performance simulation, while managing to disregard the functional details of the system. As we specify below, our approach in the face of this problem is more pragmatic, the identification of the precise causality links, very difficult for a machine, generally proves to be quite natural for the human designer. So it is preferable to make use of his expertise and intuition, in so far as he seems best able to provide the right level of information.

The purpose of the invention is to overcome the inadequacies of the prior art systems described above by means of a process that is adapted to service platforms, the main outcome of which is the automatic production of a performance model, from a functional model of the system being analysed. The performance model generated is dedicated to currently available software simulators based on queuing systems. The functional model is expressed in the form of sequence diagrams with attendant time data. The sequence diagrams may be derived from a dynamic and comprehensive system modelling carried out in SDL or in UML.

DISCLOSURE OF THE INVENTION

The process according to the invention comprises the following stages:

Distributing the representative system requests in a finite number of groups and identifying, for each request group, the corresponding execution flow, the distribution of said requests being determined by the service being called upon and by the characteristics of the customer specific behaviour, and the execution flow for each request group corresponds to the software entity execution linking, in sequence and/or in parallel, induced by a group request.

Formalising the execution flows using a notation making it possible to highlight, on the one hand, the causal relationships between the different software entities of the system that are involved in the execution flows, and on the other hand, the information characterising the system's resource consumption, such as the period of time the CPU is occupied when a software entity is active.

Developing an intermediate model that additionally comprises formalised execution flows, a resource specification that specifies the physical hardware of the system and an environment specification that represents user behaviour.

Automating the conversion of the developed intermediate model into a performance model.

Preferentially the performance model derived from the developed intermediate model is dedicated to pre-existing software simulators using queuing network techniques.

According to a characteristic of the invention, the distribution of system requests in a finite number of request groups is determined by the service being called upon (its nature), and by the characteristics of the customer specific behaviour which affect the way in which the service being called upon is delivered. The execution flow for each request group is determined by the software entity execution linking, in sequence and/or in parallel, induced by a request from the group.

According to the invention, the topology of the queuing model derived from the conversion is wholly determined by the execution flows corresponding to the request groups.

According to the invention, the derivation of a performance model dedicated to a pre-existing simulator based on queuing network techniques can be automated by adapting the correspondence rules proposed.

According to one embodiment, the formalism of the phases is achieved using an extension of the MSC (Message Sequence Charts) formalism, and the formalisation of the graph of the phases and execution flows of a service using the HMSC (High level Message Sequence Charts) formalism is represented in the form of a tree comprising:
- a plurality of nodes representing the phases constituting the service;
- at least one oriented arc leading from one node to another representing the linking in a two-phase sequence;

The formalisation tree may additionally comprise:
- at least one node followed by several arcs oriented in parallel,
- at least one node followed by several arcs oriented as a function of the choice of the following phase depending either on a condition external to the system (related for example to a customer characteristic), or on an internal condition related to the current status of the system.

In this way, the intermediate model developed comprises the formalised execution flows, associated with time data that characterises the behaviour of software entities and their interactions, at least one resource specification specifying the physical hardware, and at least one environment specification representing user behaviour.

One advantage relative to the LQN model lies in the availability on the market of a number of industrial simulation workshops, of tried and tested sophistication and power. Tools such as QNAP or SES/Workbench offer advanced analysis functionalities that allow the modelling of a very wide variety of complex systems, and the possibility of very refined model configurations, for example, the task sequencing policies may be redefined algorithmically, if none of the pre-defined policies proves to be sufficiently realistic.

BRIEF DESCRIPTION OF THE DRAWINGS

Other characteristics and advantages of the invention will emerge from the following description, given as a non-restrictive example and with reference to the appended figures in which:

FIGS. 8 to 10 show the execution flows extracted from the phase tree for the Audio-conference service;

FIGS. 11 to 20 show formalization diagrams for phases in the behaviour of the service provided;

DETAILED DISCLOSURE OF PARTICULAR EMBODIMENTS

Figure 1:
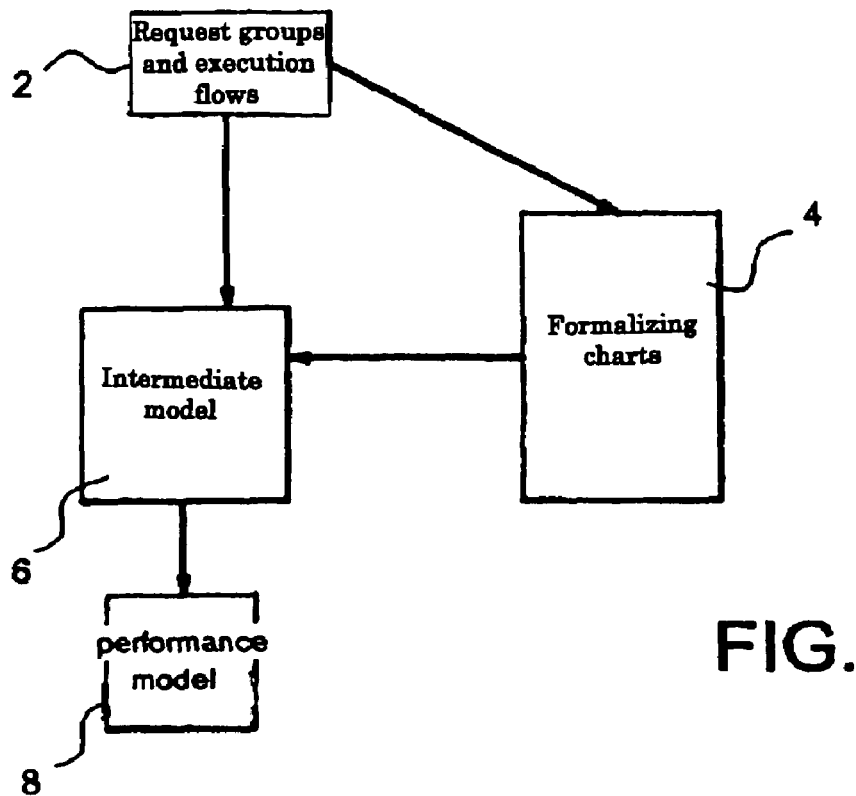
FIG. 1 shows diagrammatically the process according to the invention.

To model a system that is being analysed, the process according to the invention uses queuing systems. This choice is related to the fact that the most advanced performance simulators on the market for the most part use the queuing network model. These workshops demonstrate an acknowledged sophistication, both in terms of the richness of the functionalities and the quality of analysis and robustness.

Let us remember that a queuing system model focuses on aspects having a direct or indirect effect on the system's resource consumption (processors and machine memories, bandwidth of the data transport networks).

The process according to the invention makes it possible to model essentially:
- the distribution of the software entities which engage to provide the service on the different machines;
- the interactions, or causality relationships existing between these software entities,
- unit processing times,
- concurrent task sequencing policies,
- the capacity of the underlying networks (characterised by the transmission delays and the routing policy),
- user behaviour characterised by the request arrival flow, and by the distribution of the time separating two consecutive arrivals.

A distributed software system is generally composed of a set of software entities (process, components, etc.) running on a set of machines connected via data transport networks. This type of system is modelled by associating a server equipped with a queue with each pair consisting of a software entity and a machine on which the entity runs. Two software entities housed on one and the same machine are considered as two distinct servers. For each server defined in this way, its service and its queue correspond to the entity execution and to the machine memory respectively.

The customers are the requests sent by the users calling upon services provided by the system. As for the topology of the queuing system, this is determined entirely by the execution traces. Indeed the arrival of a request in the system causes the execution of actions on the servers. These actions may evolve simultaneously (in parallel) or be synchronised in sequence. Each execution trace is thus represented by a server tree structure. In fact, the overall topology of the queuing network is such that all execution traces are covered.

Before the model is simulated, it still has to be complemented by an environment model and resource model. The first characterises user behaviour, in terms of the flow and statistical distribution of inter-arrival times. The second specifies the execution time of each entity when the machine is entirely dedicated to it (unit tests), the transmission delays characterising the network capacity and the concurrent processing sequencing policy. This data can be integrated into the system's functional model. Simulation consists in injecting a very high number of requests into the model. The system resource use is optimised by seeking a good configuration (or parameterisation) of the different model elements. The quality of the overall configuration is evaluated by analysing by simulation its impact on the server load, on buffer occupation rates, and on quantities characterising the quality of service:

the response times of a particular component or of the system (end-to-end), the maximum processing capacity (volumetry), etc.

For any distributed software, identifying the interactions or causality relationships between the software entities may be very complex, if not impossible. In fact, the procedure proposed by the invention may be applied to systems whose behaviour may reasonably be summarised by a restricted set of execution scenarios. Ideally, the scenarios selected will evolve independently of each other. Nonetheless, systems involving dependencies between scenarios are acceptable (in the event of interaction between two customers for example), so long as these dependencies remain clearly expressible by the designer.

Service platforms constitute in this sense a practical application field for implementing the invention. Indeed, the use of this type of platform may often be characterised by a reasonable number of scenarios, corresponding to the different cases of use of the platform (in other words, to the processing of the different requests sent by the users when calling upon the services), and which have a slight dependence on each other.

As is shown diagrammatically in FIG. 1, the true point of departure, for the generation of a queuing performance model, consists in distributing the representative system requests in a finite number of request groups and in identifying (stage 2), for each request group, the corresponding execution flow. This allows the overall topology of the queuing system to be determined so that all the execution traces induced by representative requests are reflected in it. Representative requests are those with significant transmitting frequency in the system. The distribution of these requests is determined on the one hand by the service being called upon; and on the other hand, by the characteristics of the customer specific behaviour which affect the way in which the service being called upon is delivered (see in the Audio-conference example). As regards the execution flow for each request group, this corresponds to the software entity execution linking, in sequence and/or in parallel, induced by a request from the group.

Distribution of requests and identification of execution flows:

For the first step (No 2 in FIG. 1), each service in the system is represented in the form of a tree with the following characteristics:

the tree nodes represent the phases constituting the service. One particular node, the initial node, corresponds to the phase which initiates the service;

an oriented arc leading from one node to another represents the linking in sequence of two phases when a number of arcs emerge from one and the same node N, this corresponds either to the execution in parallel of all the following phases, or to a choice of execution of one and only one of the following phases. In the latter case, the choice of the next phase is related to a condition relating either to a property related to user behaviour, the condition is then called external, or to the current status of the system, in which case the condition is called internal.

Figure 8:
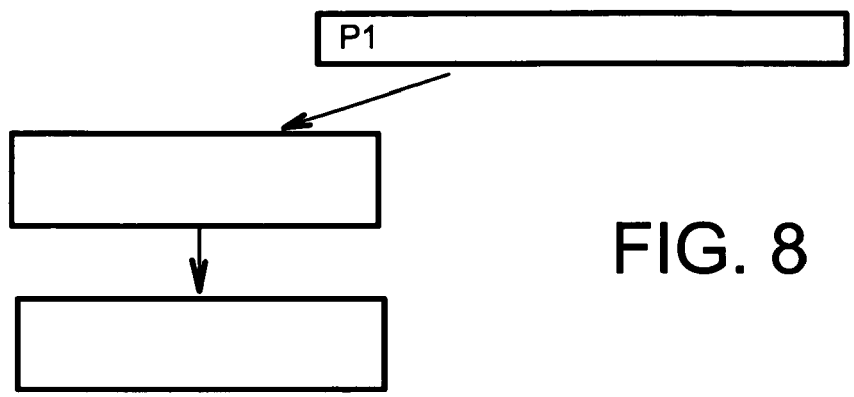
Figure 9:
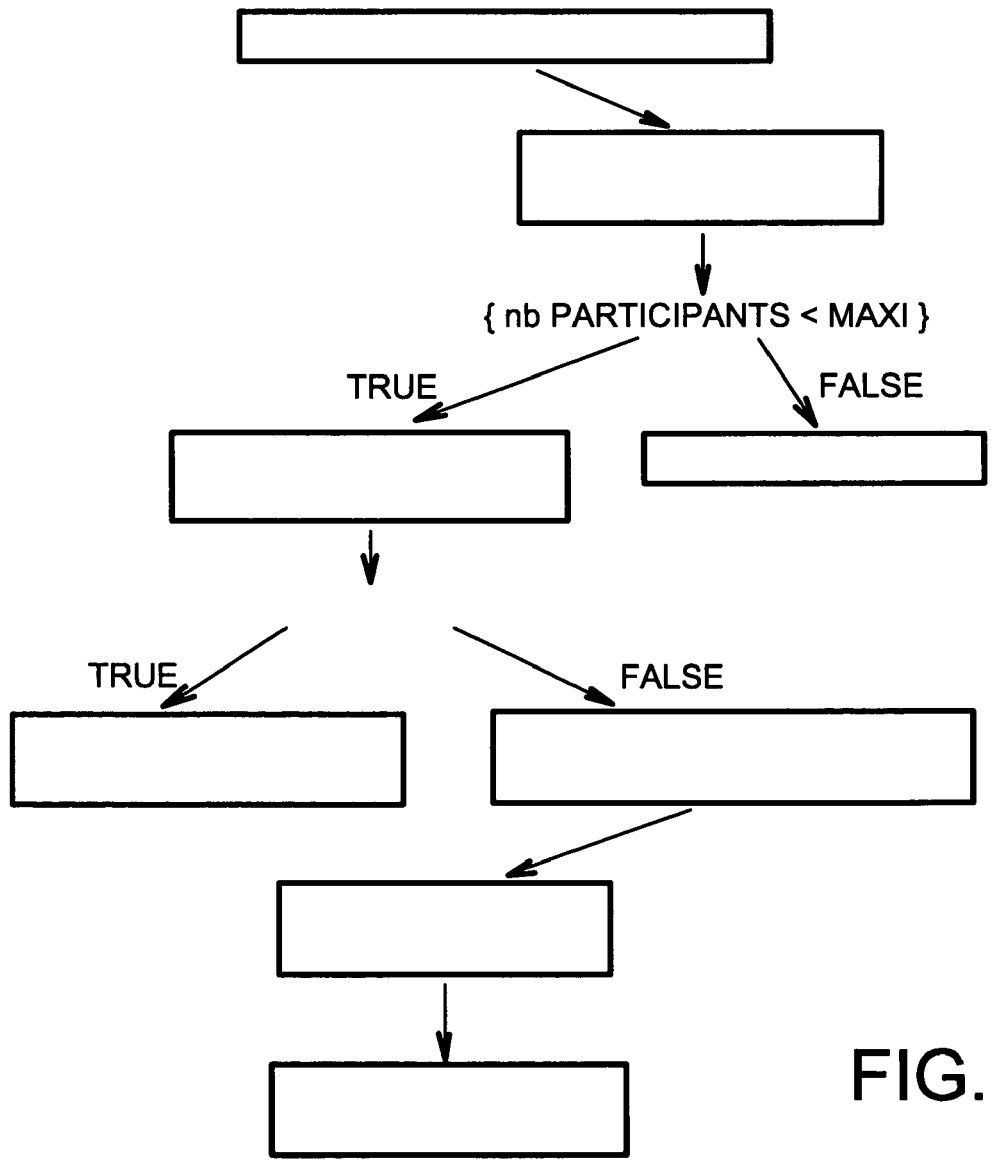

The requests are naturally grouped together on the basis of the choices made at external condition level. The corresponding execution flows can be extracted from the overall tree by going through it from the initial node, and by accepting only one successor to each external condition encountered. Consequently, an execution flow is a sub-tree of the overall tree characterised by the systematic conversion of any external alternative among N successors into a sequence linking to a single one of these successors. During the run through, any other structural aspect of the tree is on the other hand conserved (sequence linking to a simple node, linking made parallel to several nodes simultaneously, linking conditioned by the internal status of the system). FIGS. 8 to 10 show the execution flows extracted from the phase tree (FIG. 7) in the example of the Audio-conference service.

Formalisation of Performance Flows

Stage 4 in the process (FIG. 1) consists in formalising the execution flows using a notation allowing the interactions between the different software entities involved in the execution flows and information characterising the system resource consumption to be highlighted.

In the embodiment described, this formalisation is based on Message Sequence Charts (MSC). However, other sequence diagram formalisms could be used. The coherence of an MSC is optimum if the diagram is produced as a system execution trace. In the design phase, an executable specification of the system may be produced in SDL language, which is in fact a formalism closely linked to the MSC on the semantic level. In practice, all SDL tools are capable of producing simulation traces in MSC format. These same tools additionally offer the possibility of publishing such diagrams manually, and this will be the way to proceed if an SDL model simulation cannot be used.

The events which appear on an MSC diagram relate essentially to functional aspects: message sending or receipt, timer activation, setting or expiry, etc. In reality, this level of information is irrelevant or insufficient for a performance model: for example, the number of messages is of no importance. To make it possible to produce a performance model, it is necessary to specify, for the events concerned:

the period of occupation of the processor engendered by the processing of the event, the linking conditions, which specify to what extent the execution of a flow may be pursued. A linking condition relates either to the wait for the expiry of a deadline, or to the validity of a Boolean expression. It may be seen as a gate preventing the execution from continuing, and the component parts of the condition as the keys which must be assembled in order to get through this gate. These keys must be defined by the designer and be used to indicate the achievement of certain facts which then contribute to the validation of the linking condition. These keys will typically be represented by Boolean indicators such as for example is utilisateur_connecté. nb_max_tentatives_atteint, etc., the publication of facts, which may have a triggering effect on the unblocking of other flows. The processing of an event may help to fulfil the linking conditions which block the execution of another entity. In the analogy with the keys, this would correspond to the act of providing certain keys to the other entities of the system, of "publishing facts", the eventual ending of one of the parallel branches in an execution flow.

These four types of information are indispensable to the performance model, in order to calculate the response time, the load distribution of the machines, the length of the buffers etc. The process defines five corresponding clauses (including two for the linking conditions), which thus constitute the extension of the notation for formalising the execution flows: EXEC (processor occupation), EXPECT (linking condition to a Boolean expression), DELAY (linking condition to the lapse of time), PUBLISH (publication of facts), and END (ending of the flow branch). FIGS. 11 to 20 show the execution flows formalised in the example of a functional model of the Audio-conference service.

Development of an Intermediate Model

Figure 2:
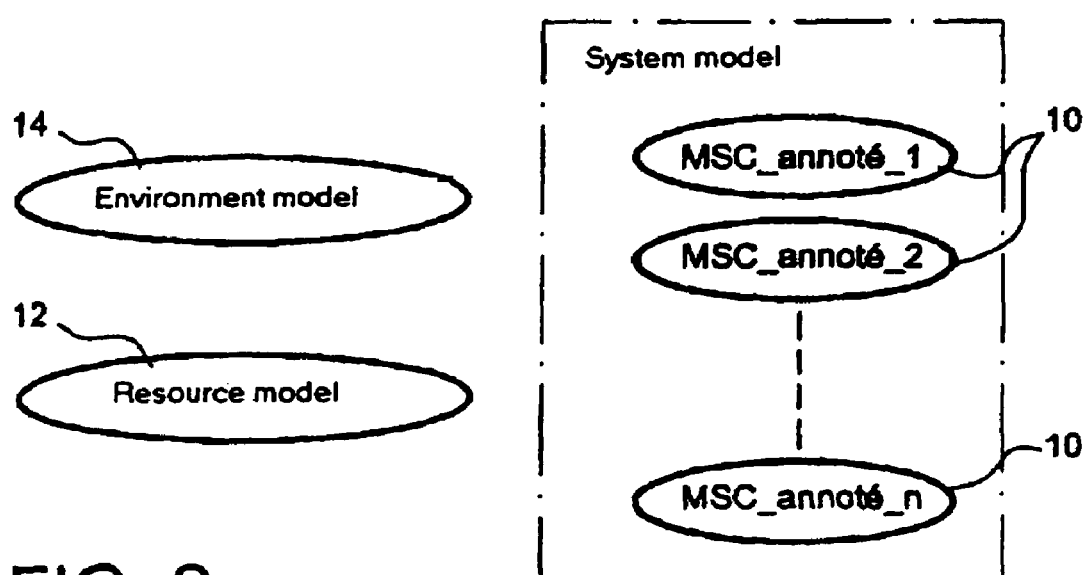
FIG. 2 shows diagrammatically an intermediate model defined by the process according to the invention.

Stage 6 in the process (FIG. 1) consists in defining an intermediate model intended to make it possible to move automatically to a performance model. In FIG. 2, it can be seen that this model is made up of formalised execution flows (10) characterising the behaviour of software entities and their interactions, of a resource specification (12) specifying the physical hardware, and of an environment specification 14 representing users behaviour.

The resource model contains the following declarations:
the machines, the size of the buffers and the policy for sequencing the simultaneous processing operations of these machines;
the data transport networks and the topologies thereof that allow the machines to be connected;
the software entities (programs with a single execution string), and their distribution over the resources;
the capacities of the machines expressed relative to the unit processing times of the tasks (formalised by EXEC);
the capacities of the transmission links expressed relative to the transmission delays;

In the environment model, which characterises the request traffic generated by the users, the following data must be specified:
the request arrival rate;
the pace of arrival; it is characterised wholly by the distribution of the time period separating two consecutive arrivals;
the attributes; these are variables specific to each request; in particular they allow the different classes of request determined by the execution flows to be identified; other variables are used to express the Boolean synchronisation conditions between parallel branches of one and the same execution flow.
the proportion of each request class (this distribution is provided by observations or estimations as to the future use of the platform)

Automatic Conversion into a Performance Model

Stage 8 in the process (FIG. 1) consists in defining correspondence rules between the elements of the intermediate model and the primitives of a non-specialised simulator based on queuing systems.

Conversion becomes automatic when correspondence rules are applied. The latter apply just as well to all simulators in this category: they are all founded on the same basic concepts, only the mode of representation of these concepts differs. The coherence of the conversion is based on semantic rules (not clarified in the present document), which make it possible to detect erroneous specifications leading to incomplete or senseless performance models. We now show the procedure in the case where the SES/Workbench simulator is used.

Figure 3:
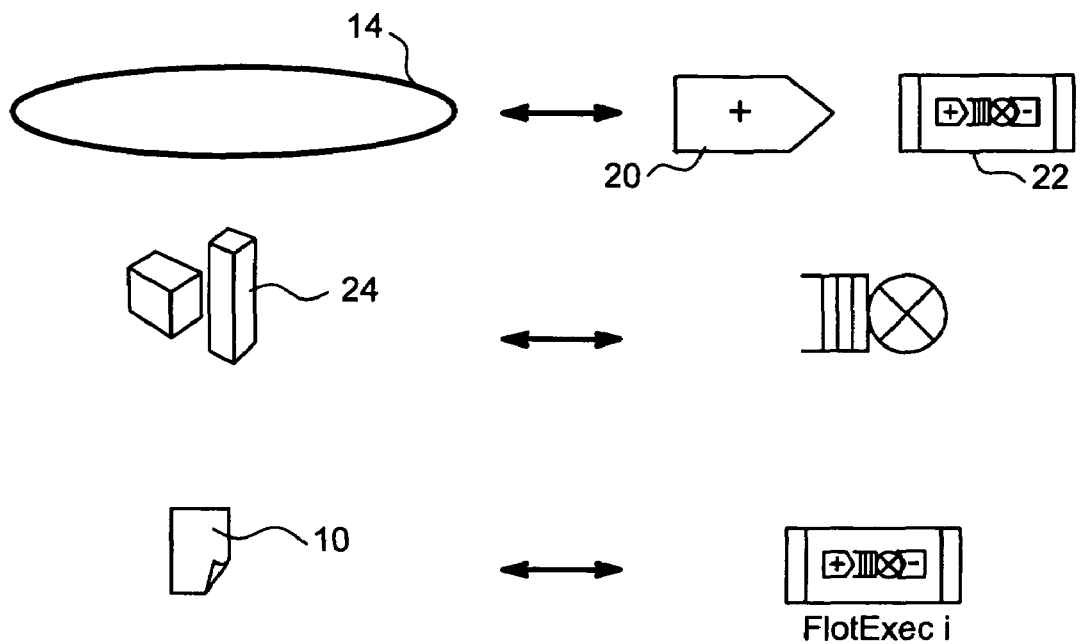
FIG. 3 shows diagrammatically the association of the different elements of the intermediate model and primitives of the SES/Workbench simulator based on queuing systems.

FIG. 3 shows diagrammatically the correspondence rules between the intermediate model and SES/Workbench "nodes". By denoting by R={machine_1, to machine_m} and F={flotExecFormalisé_1, to flotExecFormalisé_n} respectively the set of machines in the system declared in the resource model and the set of formalised execution flows of the system services:
The environment model 14 is associated with a "source" node 20, followed possibly by a "sub-model" node 22. The latter is useful in the most complex cases, for example in the case of requests structured by sessions or at a number of levels;
The resource model 12 containing the declaration of the set R of m machines is associated with a set of m "service" nodes designated by a logic name (serveur_j for example), for any j;
Each flotExecformalisé_i 10 is associated with a "sub-model" node denoted by a logic name (flotExec_i for example) for any i;
Each "sub-model" node associated with the formalised execution flow is developed, by making the following correspondences between events of the formalised execution flow and SES primitives. The different associations are described by FIGS. 4a to 4h.

Figure 4A:
FIGS. 4*a* to 4*h* show diagrammatically the correspondence rules between the annotated events characterising the behaviour of software entities and primitives of the SES simulator.
Figure 4B:
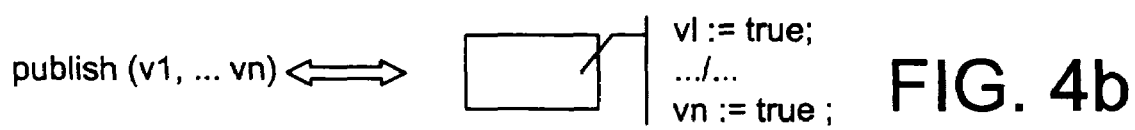

With reference to FIG. 4a, the primitive "EXEC(t)" is associated with a two node sequence: a "user" node, followed by a "service reference_to" node. The user node makes it possible to specify the value of t corresponding to the code execution time, whereas the "service reference_to" node refers to the service node declared in the module which corresponds to the machine housing the process which carries out the "EXEC(t)".

The publication of facts "PUBLISH" is associated (FIG. 4b) with a "user" node containing the appropriate program C. This program modifies the variables which represent the keys or facts for publication.

Figure 4C:
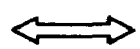
Figure 4C:
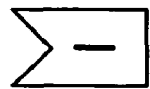
Figure 4D:
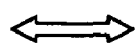
Figure 4D:

The flow branch end "END" is associated with a "sink" node (FIG. 4c).

The primitive "DELAY (t)" is associated with a "delay" node (FIG. 4d) and the value of t is the node parameter.

Figure 4E:
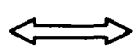
Figure 4E:
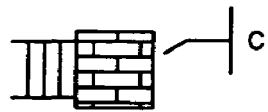

The linking condition "EXPECT" is associated with a "block" node, where it is expressed by a Boolean expression c given as a node parameter (FIG. 4e).

Figure 4F:
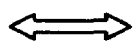
Figure 4F:

The linking in sequence of the events is represented by an arc between the nodes (FIG. 4f).

Figure 4G:
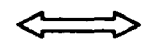
Figure 4G:

The choice of a linking of events among N possible linkings is represented by N arcs starting from the node where the choice is made. The conditions determining a choice are specified in the corresponding arc (FIG. 4g).

Figure 4H:
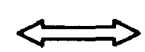
Figure 4H:
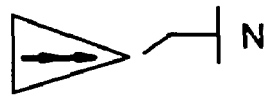

Finally the separation of the flow into N parallel branches is represented by a "split" node (FIG. 4h).

Figure 5:
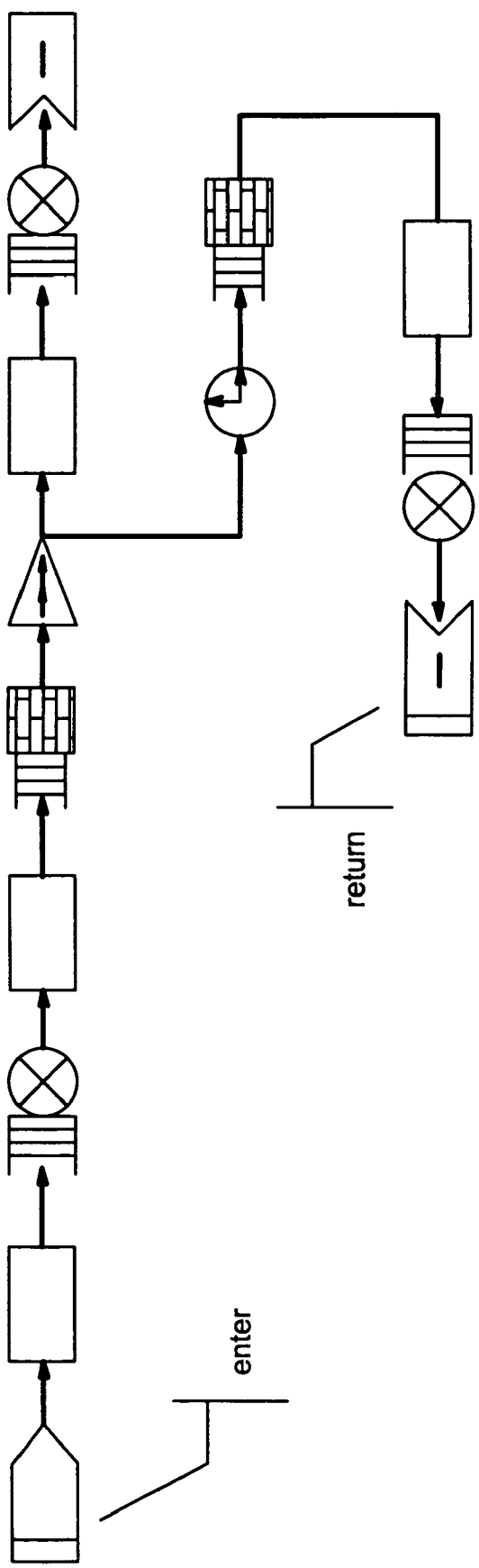
FIG. 5 shows diagrammatically an SES sub-model derived from a formalised execution flow by applying correspondence rules shown in FIGS. 4*a* to 4*h*.

FIG. 5 shows the sequence corresponding to the sub-model of a formalised execution flow complemented by an "enter" node and by a "return" node which represent the sub-model input and output respectively.

Figure 6:
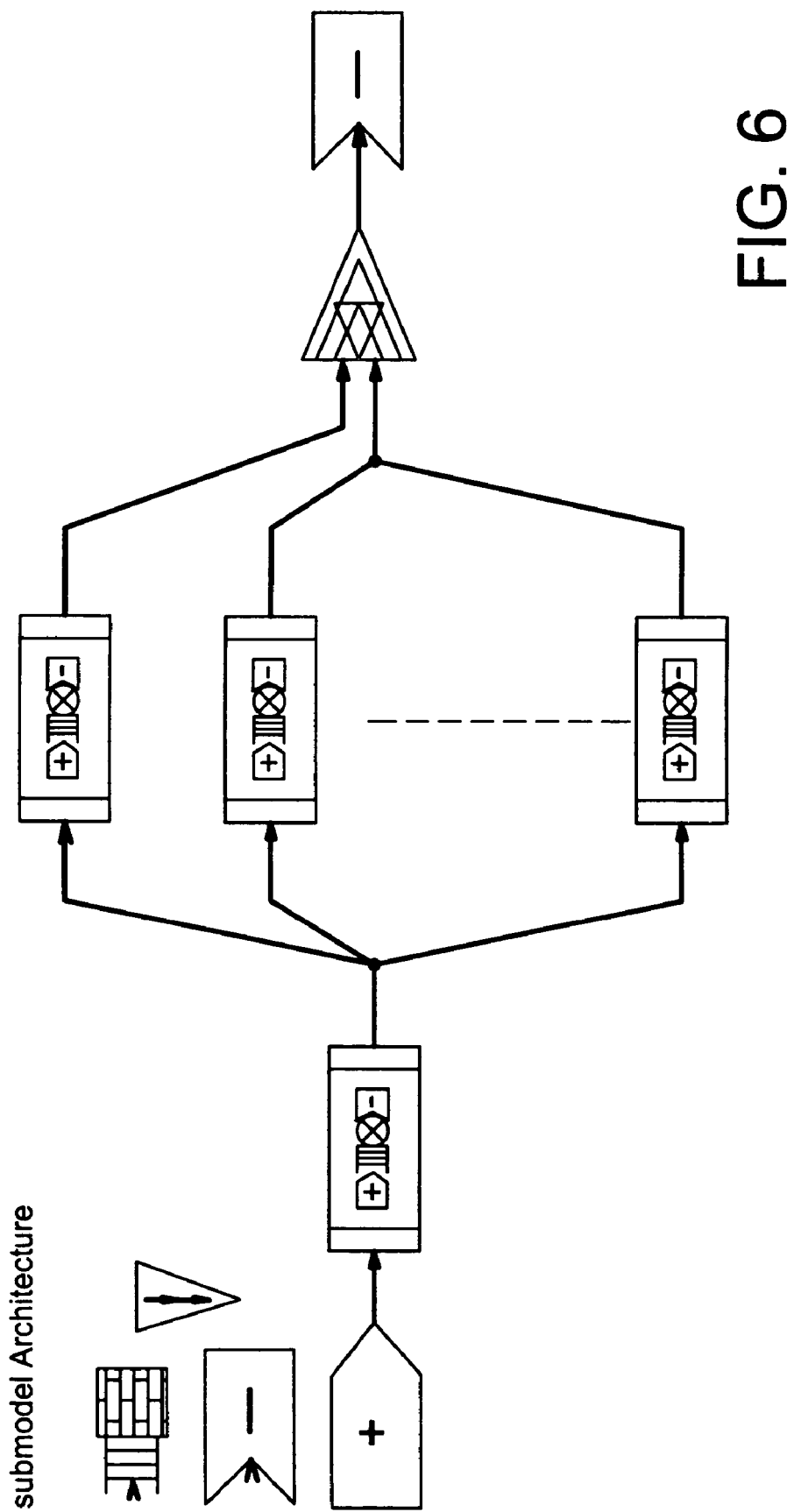
FIG. 6 shows an SES sub-model of the overall system architecture obtained by applying correspondence rules shown in FIG. 3.

FIG. 6 shows the overall system architecture, which brings together the execution flow sub-models and the environment sub-model.

APPLICATION EXAMPLE

Audio-Conference Platform

Informal presentation of the audio-conference service.

The Audio-conference service allows a specific number of users, by prior agreement, each on their own side and at an agreed date and time, to dial a telephone number in order to set up a connection with a conference bridge, a conference bridge having previously been reserved by one of the participants, who has specified the date, time, duration and the number of participants.

The provision of the conference session set-up service, offered by the Audio-conference platform depends on the role (on the nature) of the customer calling upon it:

is he the session organiser?
is he an ordinary participant?
is he authorised to participate in the session?

This classification allows the different request types to be identified. Furthermore, it may be that one type of request interacts with another. For example, the processing of the request of an ordinary participant in an Audio-conference session is deferred until the organiser of this session arrives.

A particular role is assigned to the conference Organiser. The conference may not start before the Organiser arrives, in other words the participants cannot be connected to the conference bridge while the Organiser is absent. The conference is closed after the Organiser hangs up, and the participants still on line will then be disconnected from the conference bridge. The subscription, which consists mainly in reserving a conference bridge access number, is operated through the service provider. The data is consequently retrieved from the database.

Call Control

Call control can be broken down in accordance with the following phases (observation: we are concerned, in terms of this case study, only with the opening of conferences, and not with their development or their closure):

1) A participant dials the programmed conference access number (NAS service access number). This number is made up of a service specific OZABPQ prefix, while the MCDU suffix is specific to the conference subscribed to. The service translates the service access number into a real conference bridge access number (NAC).

2) Several scenarios are possible:

So long as the number of participants is below the maximum capacity of the conference bridge and the Organiser has not called upon the service, a message is sent with the information that the organiser is delayed, then a second one with an invitation to wait for the conference to open.

When the Organiser presents himself, the waiting participants are then connected to the conference bridge (as is the Organiser). The conference is declared open.

If the number of participants already connected reaches the maximum number defined by the subscriber, the service rejects the call with an all lines engaged message.

Service Specific Messages

The wording of the service specific messages are as follows:

welcome: "you have dialled a conference access number, please hold the line"
all lines engaged: "the number you have dialled is engaged, we are unable to connect you".
fault: "sorry there is a fault, we are unable to connect you".
information: "your organiser is not yet connected".
wait: "please hold the line, you will be connected with your correspondents as soon as the conference opens".

Data

The service specific data is:
the service access numbers
the translated numbers (the bridge network number)
the maximum number of participants per conference bridge.
the status of the resource associated with the conference bridge
the reports table
the national, international and special analysis tables (for possible controls over the calling number).

This data is of different types, depending on whether it is modified or not modified by the call control scripts. Data that cannot be modified by the call control is in a database here called SDF (Service Data Function), it is accessible in read mode by the call control scripts and in write mode by management scripts. The data that can be modified by the call control is in a database accessible in read and write mode by the call control scripts. This database must provide more significant access performance. The latter type of data item is represented here by the maximum number of participants, and by the status of the resource.

Application of Stages in the Process

From the informal service description, the first stage consists in identifying the elementary phases and their organisation in a phase tree.

All user behaviours are not taken into account, only the most representative cases of use are expressed. In particular, the number of times people hang up is taken into account in the conversation phase and in the waiting phase, the most pertinent cases of hanging up as far as users are concerned.

Figure 7:
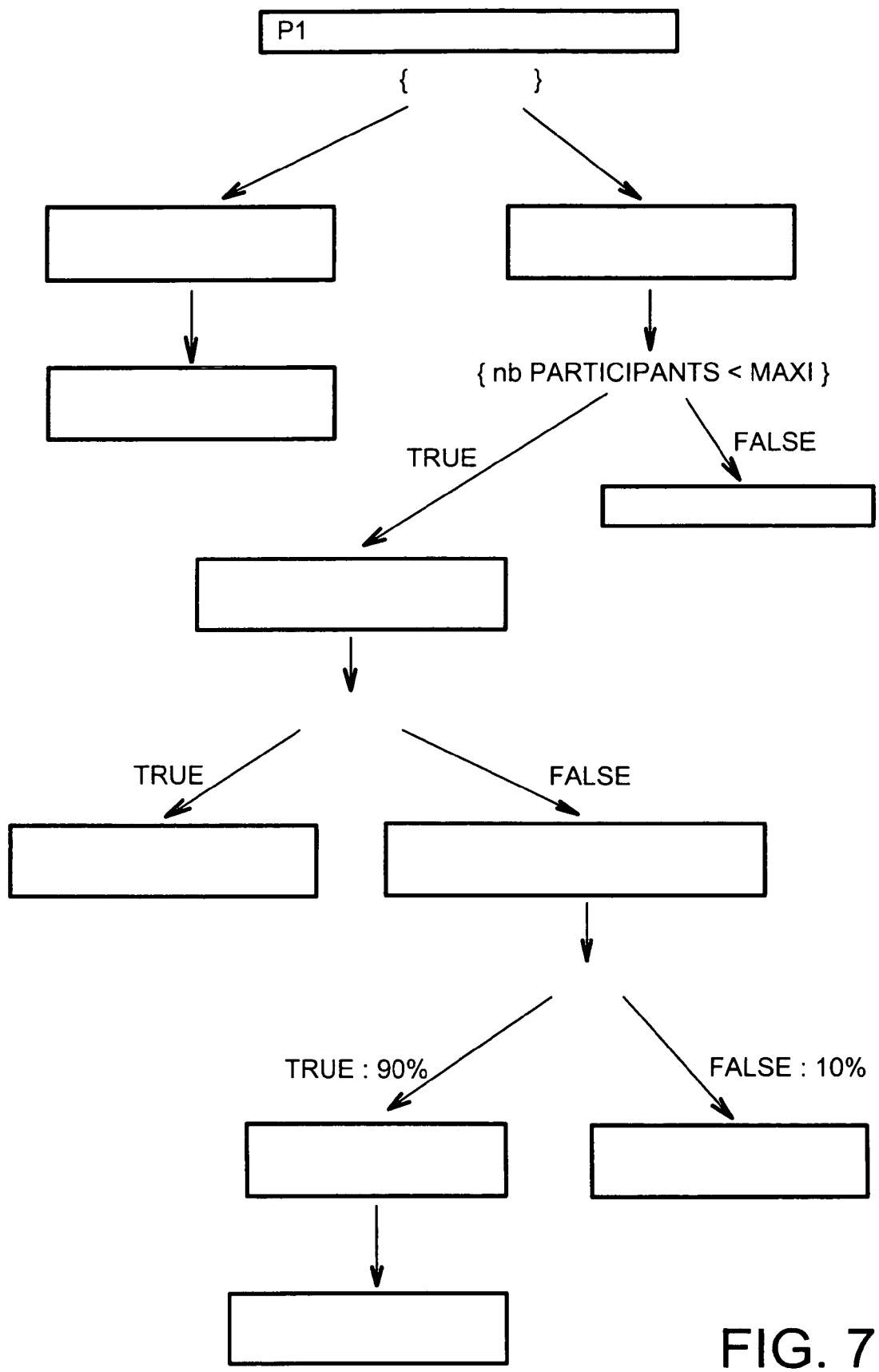
FIG. 7 shows diagrammatically the phase tree representing the different stages for the provision of an Audio-conference service according to the process in the invention.

FIG. 7 shows the overall phase tree which describes the linking of the different phases by specifying the internal or external alternatives. The external conditions can be recognised from the fact that the arcs emerging from them are statistical percentages.

After a connection phase P1, an external alternative makes it possible to identify whether the user is the organiser (P2) or an ordinary participant (P4). If the user is a participant, an internal alternative {nbParticipants<MAXI}, whose option depends on the execution of other scenarios, identifies whether the maximum number of participants is reached or not. If this number is reached, a phase for sending a saturation message is initiated (P6). If this maximum number is not reached (P5), a second internal alternative {organisateurpresent} makes it possible to identify whether the organiser is already present. If he is already present, the participant is connected to the bridge (P7, preceded by a welcome message). If the organiser is absent, a wait message is sent to the participant (phase P8). In this phase, an external condition {participantPatient} makes it possible to distinguish the case where the participant is awaiting the arrival of the organiser (phase P10) and enters the conference (phase P7) upon the arrival of the Organiser, from the case where the participant is more of the "impatient" type, in other words he hangs up following the delay report issued in phase P9. In this case, the number of participants is reduced by one unit. Once again, it is assumed that only the performance of the phases related to setting up the conference are of concern to us in this example, which explains that the tree does not contain any phase relating to the subsequent development of the conference.

The requests in the example are divided into three groups: requests sent by an organiser; requests sent by an ordinary patient participant; and requests sent by an ordinary impatient participant. From the overall phase tree, the three corresponding execution flows are then extracted while retaining only one branch of each external alternative:

execution flow induced by the arrival of the organiser (FIG. 8);
execution flow induced by the arrival of an ordinary patient participant (FIG. 9);
execution flow induced by the arrival of an ordinary impatient participant FIG. 10).

Identifying the Keys and Gates of the Relevant Phases

The second stage in the process consists in identifying the keys and gates which affect the behaviour of one case of use from the behaviour of one or more other cases of use. In the case of the Audio-conference service, a key is identified that is related to the presence of the organiser. Phase P3, executed when the organiser arrives, includes the PUBLISH (organisateurPresent) task.

Such publication will make it possible to unblock phase P10 which includes an "EXPECT (organisateurPresent)" task.

The nbParticipants variable is increased by 1 when a user (not the organiser) is connected, unless it is already at its maximum authorised value (MAXI). This test is represented by an internal alternative in the phase tree.

Phase Formalisation

FIGS. 11 to 20 show formalisation diagrams of the service behaviour phases, the MSC associated with different phases of the service behaviour will be given with a simplified view over the name of the signals. Likewise, not all the exchanges are shown so as not to overload the diagrams.

The instances considered in these MSC are:
the SDF (Service Data Function or service database),
the SCF (Service Control Function or service execution platform),
the SRF (Service Resource Function or voice platform) and the USER (users).
The signal exchanges correspond:
to database interrogations:
caller (numéroAppelant) interrogates the database on the calling number (P2, P4);
typeAppelant is the response from the database, it can assume the values of ORGANISER (if the caller is the organiser) or PARTICIPANT (if the caller is not the organizer).
to exchanges of voice messages passing through the voice platform: send_message to the voice platform, msg_info to the user (P6, P7, P9).
to exchanges for synchronisation by the gates:
PUBLISH (organisateurpresent) will allow the fact to be published that the organiser has just been connected,
EXPECT (organiserpresent) allows the execution of the SCF entity to be blocked until the organiser arrives.

FIG. 11 shows the formalisation of the service call up phase.

Figure 12:
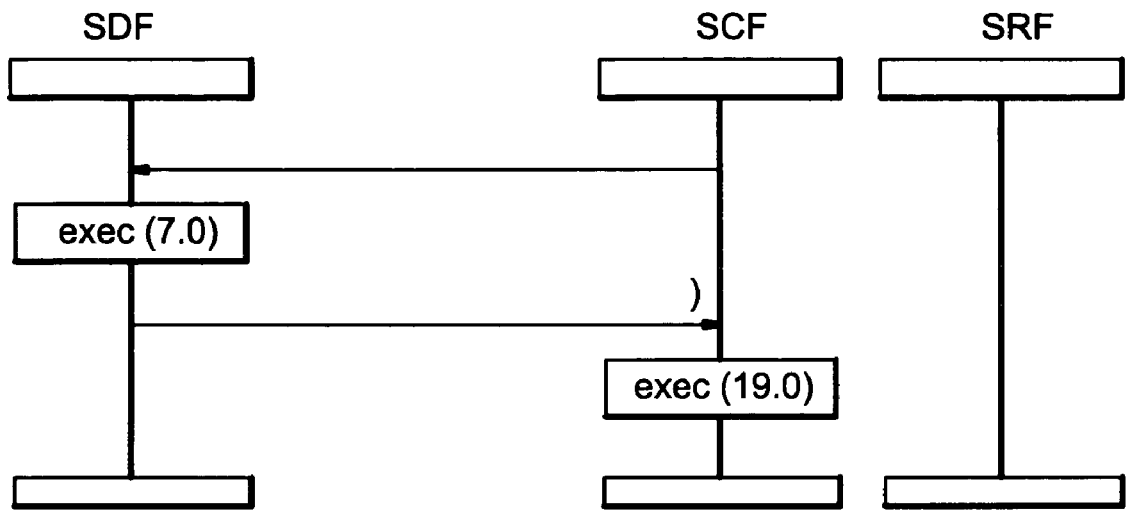

FIG. 12 shows the formalisation of the "Organiser Identified" phase.

Figure 13:
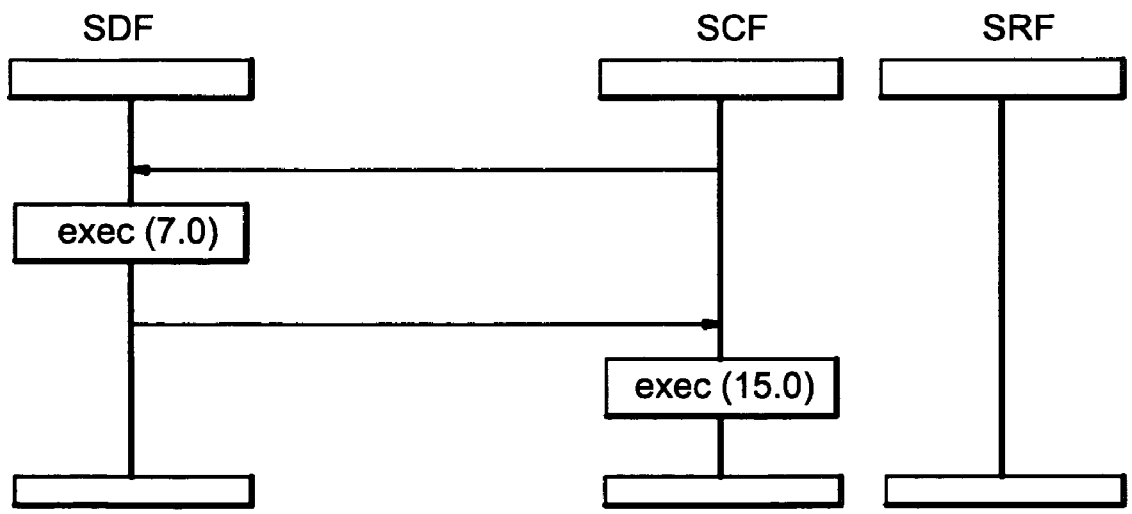

FIG. 13 shows the Formalisation of the "Participant Identified" phase.

Figure 14:
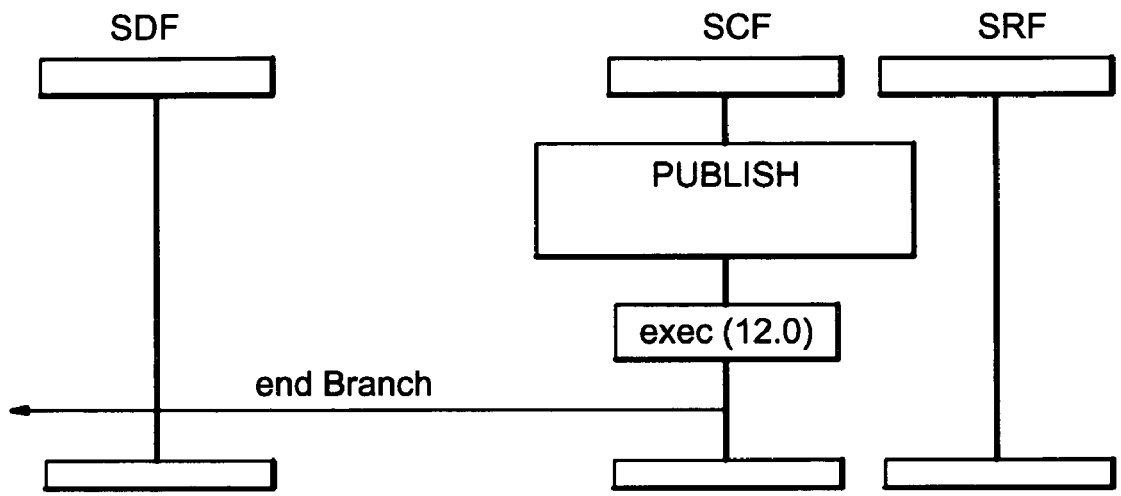

FIG. 14 shows the formalisation of the "Conference Opens" phase

Figure 15:
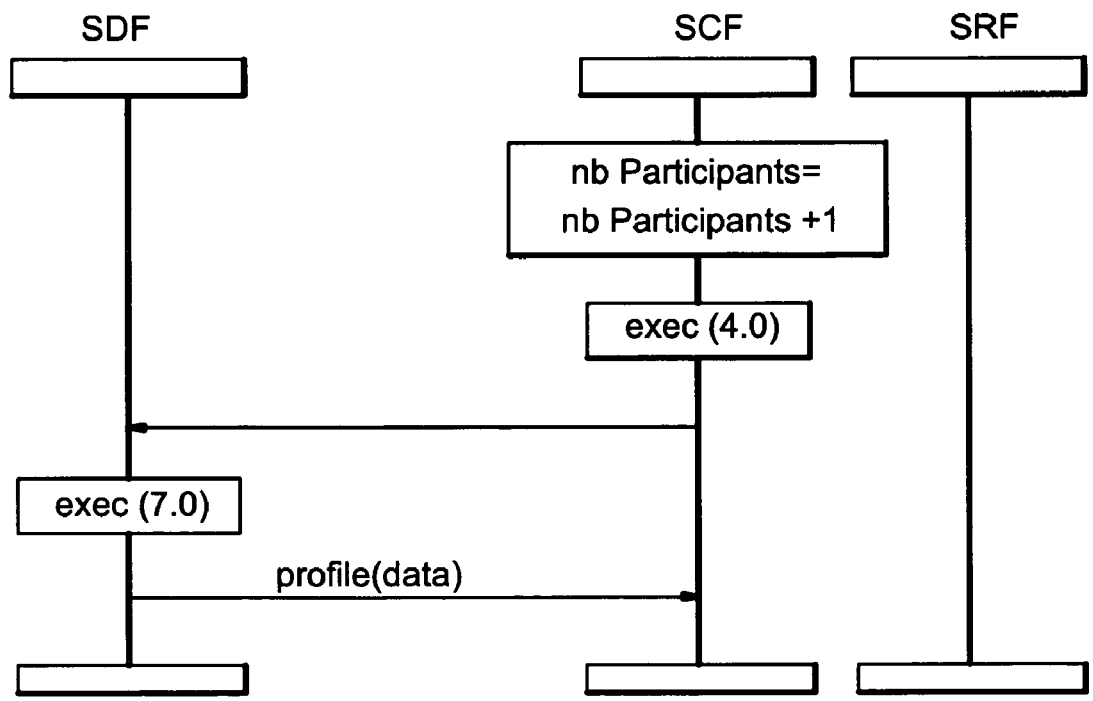

FIG. 15 shows the formalisation of the "Participant Connected" phase.

Figure 16:
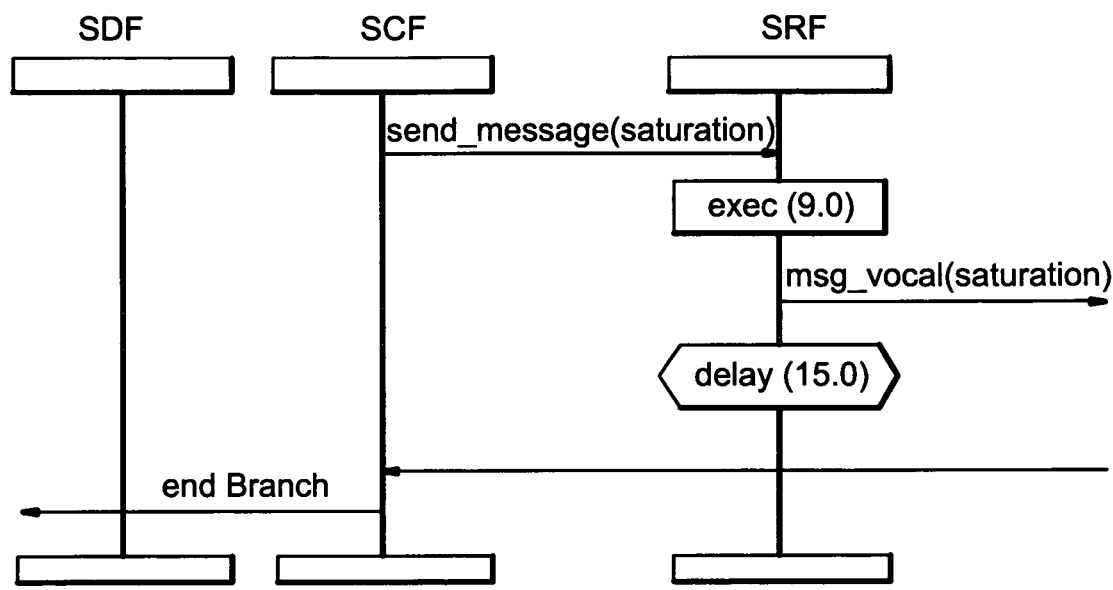

FIG. 16 shows the formalisation of the "Disconnection all lines engaged" phase.

Figure 17:
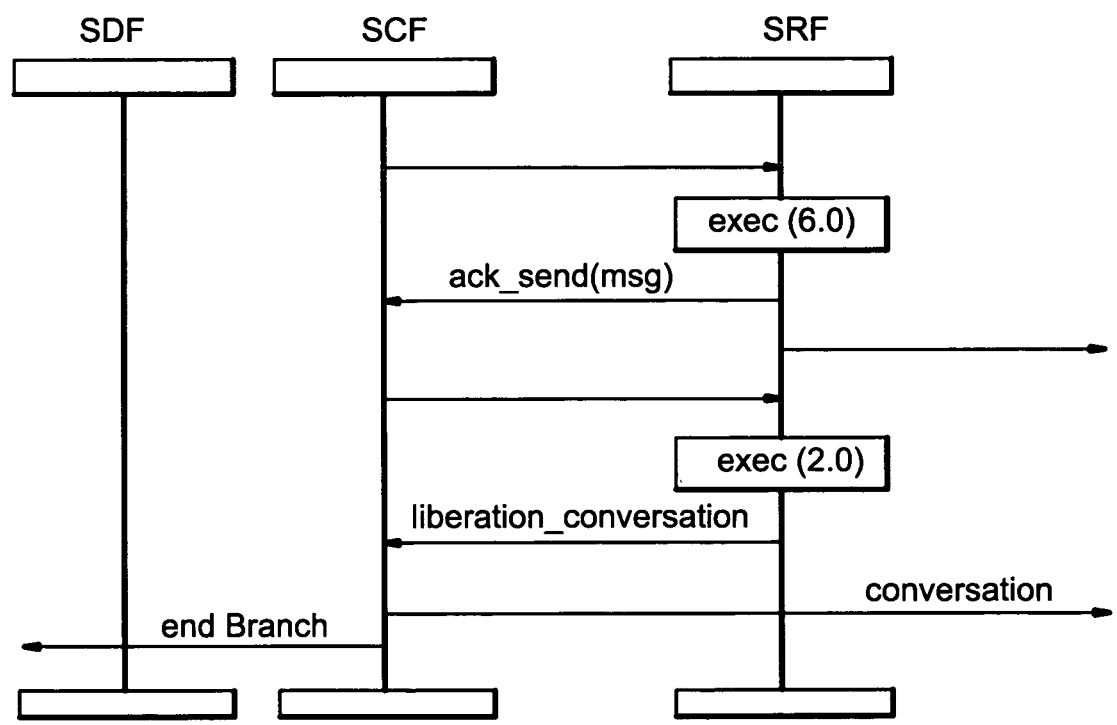

FIG. 17 shows the formalisation of the "Enter Conference" phase.

Figure 18:
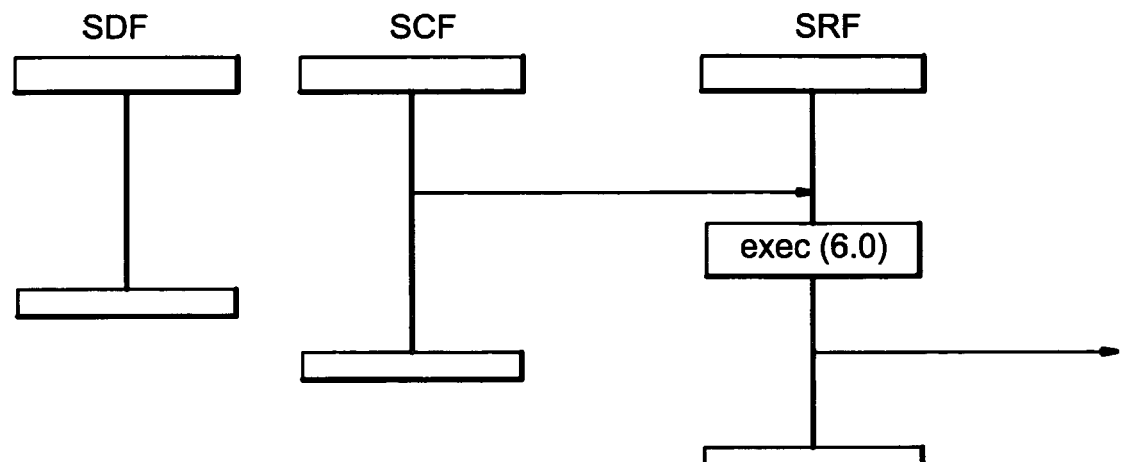

FIG. 18 shows the formalisation of the "Organiser Delay Reported" phase.

Figure 19:
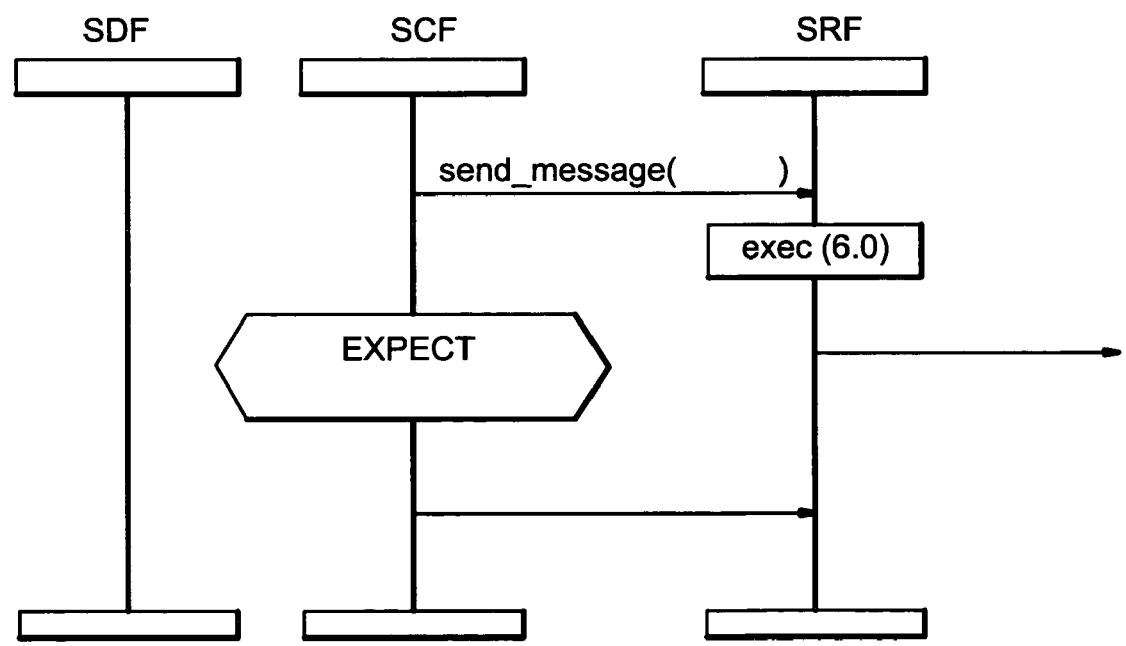

FIG. 19 shows the formalisation of the "Wait for Organiser" phase.

Figure 20:
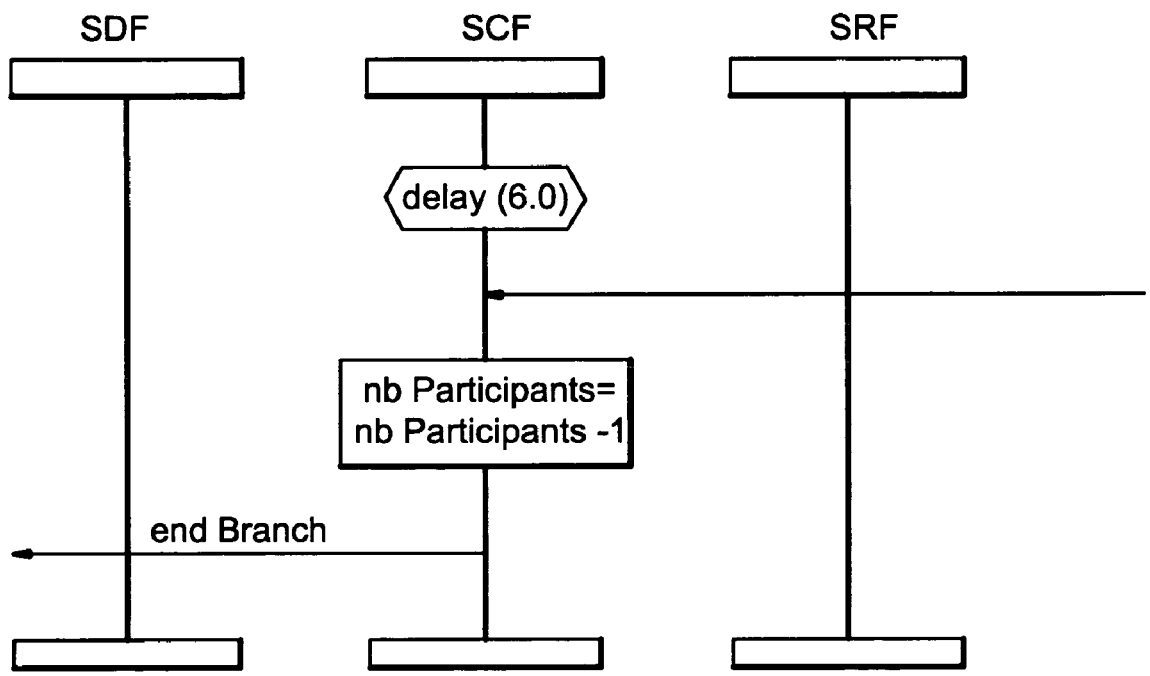

FIG. 20 shows the formalisation of the "Quit while waiting" phase.

Performance Model Derived from the Functional Model

Figure 21:
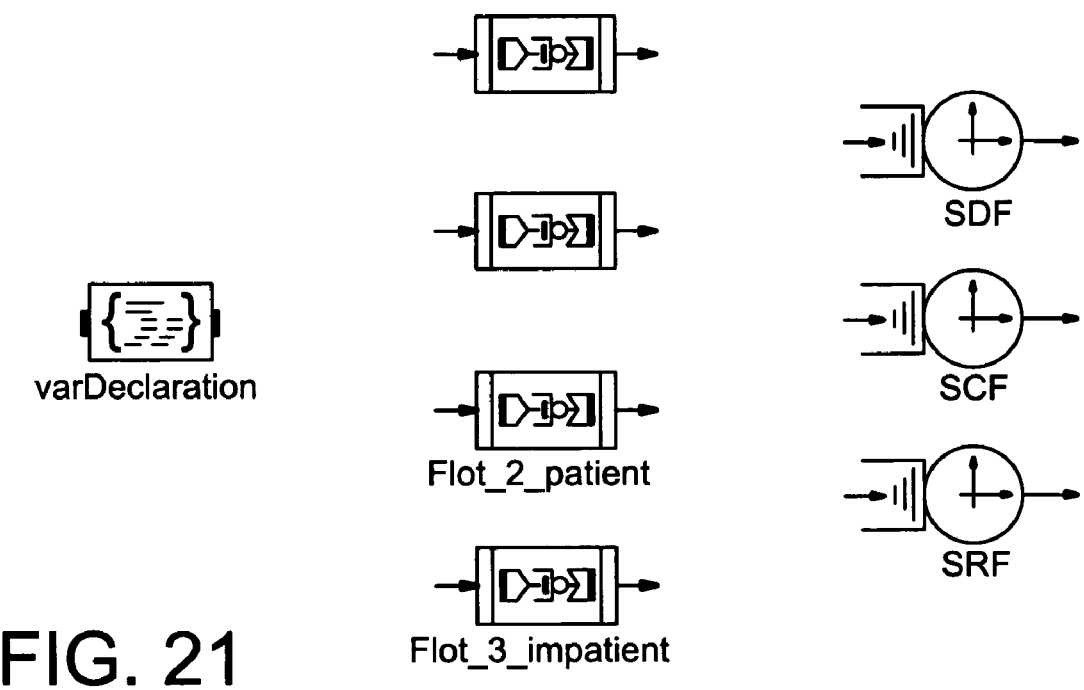
FIG. 21 shows the resource declaration, the execution flows and the sub-model of the overall architecture of an audio-conference platform in the SES model.

FIG. 21 shows the general view of the intermediate model (in SES/Workbench). In this can be found: the resource declaration, the three execution flows and the sub-model of the overall architecture of the Audio-conference platform. In this example, the SDF, SCF and SRF processes each run on a machine.

Figure 22:
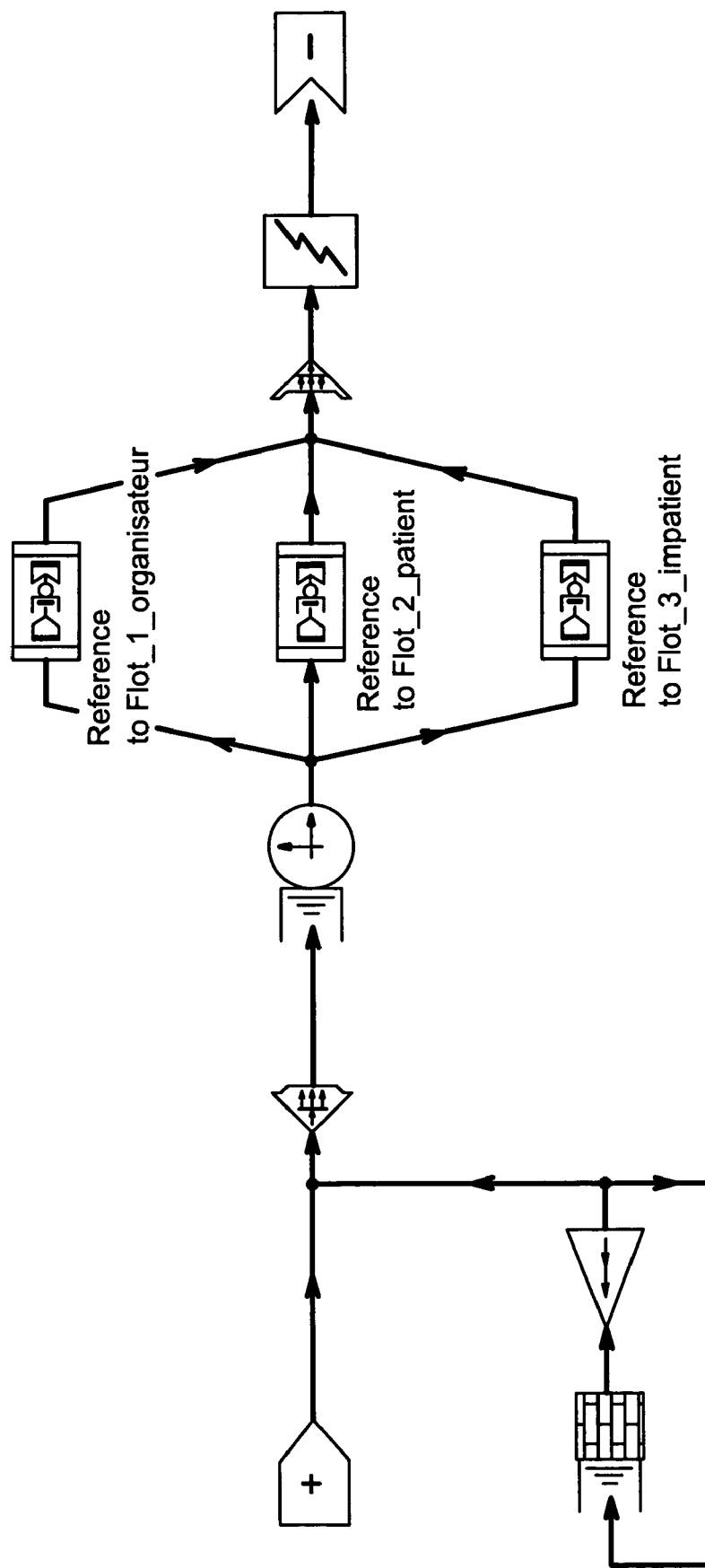
FIG. 22 shows an SES sub-model of the overall architecture of the audio-conference platform.

An internal view of the overall architecture of the platform is shown in FIG. 22.

The initSession (initiate Session) node initiates the creation of the maximum number of simultaneous sessions authorised by the platform. The appelsDuneSession (Session calls) node generates calls for each session opened and the interAppOrdre (Inter-call order) node models the periods of time which separate the consecutive calls in a session and the rank at which the organiser arrives. Finally, each session end, represented by the fermetureSession (close Session) node triggers the creation of a new session represented by the creationSession (create Session) node.

Figure 23:
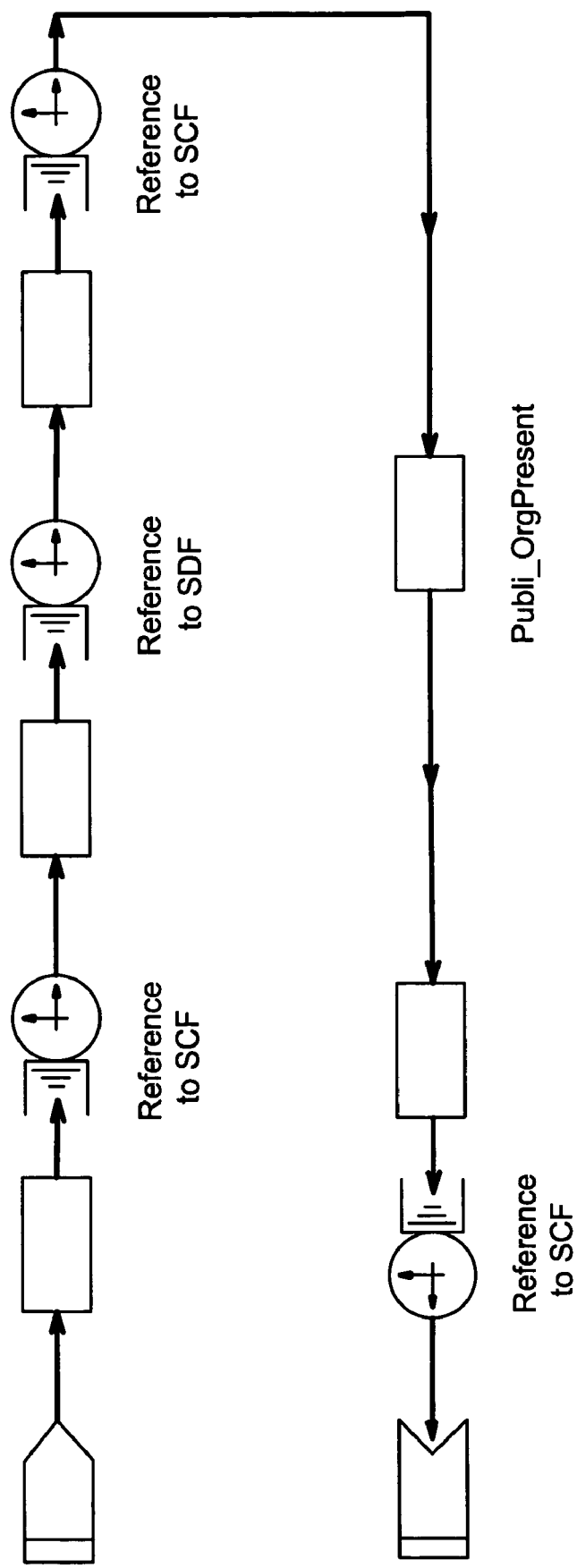
FIGS. 23 to 25 show the SES sub-models derived from the different formalised execution flows by applying correspondence rules shown in figures for 4*a* to 4*h*.
Figure 24:
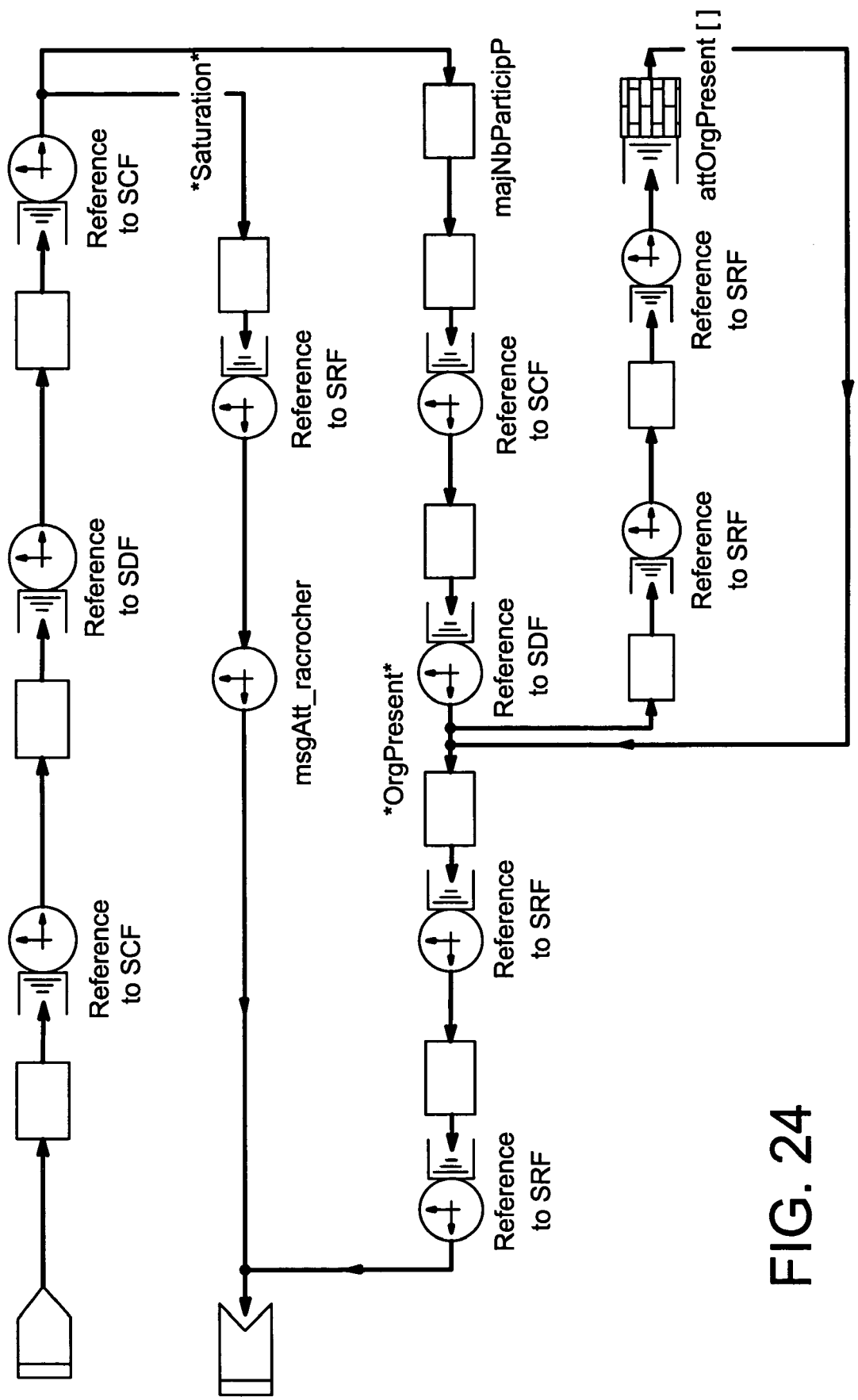
Figure 25:
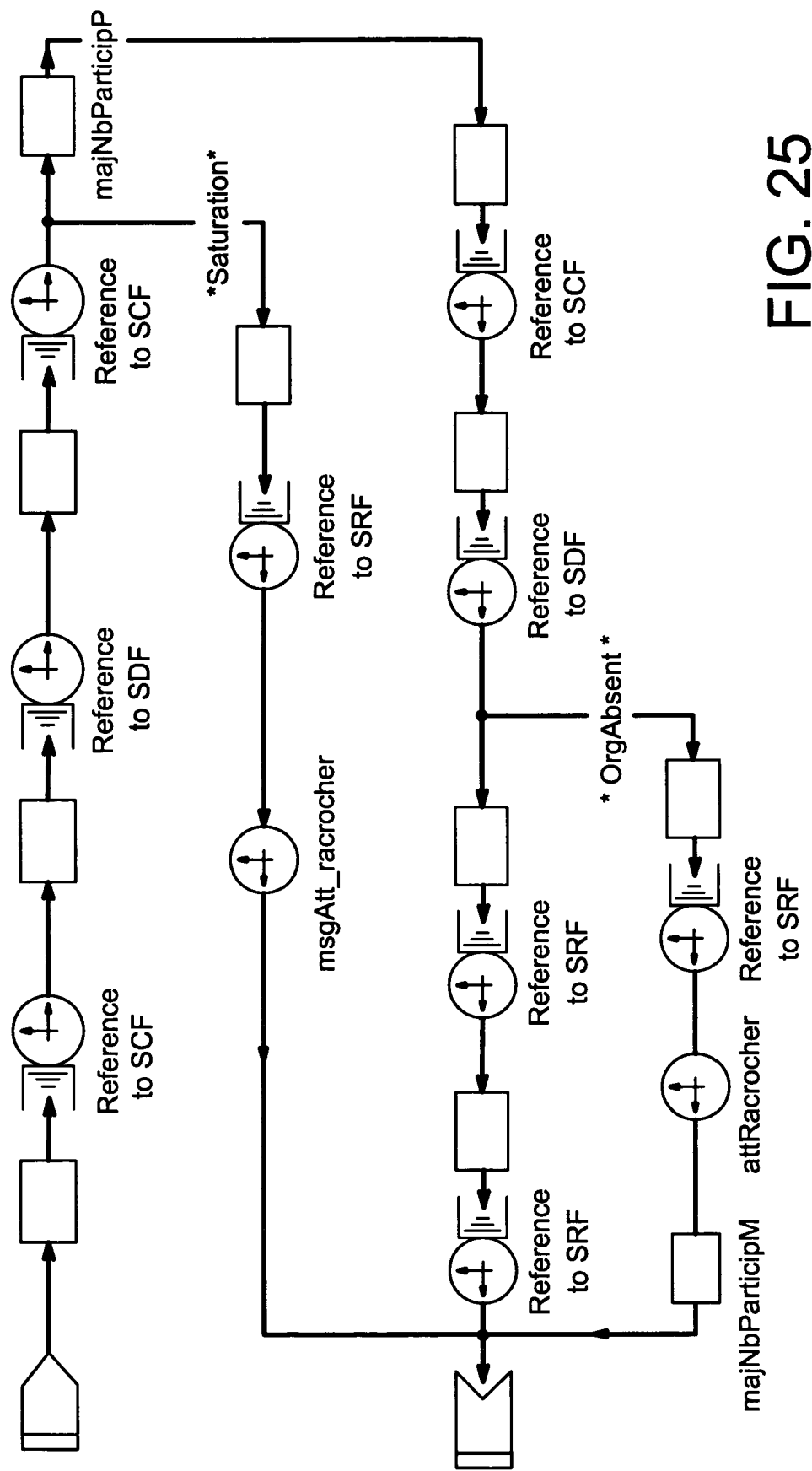

FIGS. 23, 24, and 25 shows the three sub-models resulting from converting the performance flows of the organiser, a patient participant, and an impatient participant respectively.

The invention claimed is:

1. A process for generating a performance model from a functional model for a system including a plurality of distributed hardware and software entities that engage to provide a service to at least one user, the process comprising:
distributing representative system requests in a finite number of groups and identifying, for each request group, a corresponding execution flow, the distributing of the requests being determined by a service being called upon and by characteristics of customer specific behavior, and the execution flow for each request group corresponding to a software entity execution linking, in sequence and/or in parallel, induced by a group request;
formalizing the execution flow using a notation identifying causal relationships between different software entities of the system that are involved in the execution flows, the notation including resource consumption metrics, attributing specific resource consumption values in correspondence to a respective execution flow;
developing an intermediate model that comprises, in addition to the formalized execution flows, a resource specification quantifying resources available from physical hardware of the system, and an environment specification quantifying the amount of requests generated by said at least user; and
automating conversion of the developed intermediate model into a performance model.

2. The process according to claim 1, wherein the performance model derived from the developed intermediate model is dedicated to pre-existing software simulators using queuing network techniques.

3. The process according to claim 1, wherein the distributing the requests in a finite number of request groups is determined by the service being called upon, and by characteristics of the customer specific behavior that affect a way in which the service being called upon is delivered.

4. The process according to claim 1, wherein the execution flow for each request group is determined by the software entity execution linking, in sequence and/or in parallel, induced by a group request.

5. The process according to claim 4, wherein topology of a queuing model derived from the conversion is wholly determined by the execution flow corresponding to the request group.

6. The process according to claim 4, wherein derivation of a performance model dedicated to a pre-existing simulator based on queuing network techniques can be automated by adapting correspondence rules proposed.

7. The process according to claim 6, wherein formalism of phases is achieved using an extension of a MSC (Message Sequence Charts) formalism.

8. The process according to claim 7, wherein the formalism of a graph of phases and execution flow of a service using a HMSC (High level Message Sequence Charts) formalism is represented in a form of a formalization tree comprising:

a plurality of nodes representing phases constituting the service; and at least one oriented arc leading from a first node to a second node representing linking in a two-phase sequence.

9. The process according to claim 8, wherein the formalization tree further comprises:

at least one node followed by plural arcs oriented in parallel; and at least one node followed by plural arcs oriented as a function of choice of a following phase depending either on a condition external to the system, or on an internal condition related to a current status of the system.

10. The process according to claim 9, wherein the intermediate model developed comprises the formalized execution flows characterizing the behavior of software entities and their interactions, at least one resource specification specifying the physical hardware, and at least one environment specification representing user behavior.

* * * * *